(12) United States Patent
Fasching et al.

(10) Patent No.: US 10,908,281 B2
(45) Date of Patent: Feb. 2, 2021

(54) SYSTEM FOR OBJECT DETECTION

(71) Applicant: Tallyho! Inc., Mill Valley, CA (US)

(72) Inventors: Rainer J. Fasching, Mill Valley, CA (US); Ghyrn E. Loveness, Mountain View, CA (US)

(*) Notice: Subject to any disclaimer, the term of this patent is extended or adjusted under 35 U.S.C. 154(b) by 411 days.

(21) Appl. No.: 15/881,672

(22) Filed: Jan. 26, 2018

(65) Prior Publication Data

US 2018/0210083 A1   Jul. 26, 2018

Related U.S. Application Data

(60) Provisional application No. 62/508,391, filed on May 19, 2017, provisional application No. 62/508,392, filed on May 19, 2017, provisional application No. 62/452,349, filed on Jan. 30, 2017, provisional application No. 62/450,669, filed on Jan. 26, 2017.

(51) Int. Cl.

| | | |
|---|---|---|
| *G01S 17/02* | (2020.01) | |
| *G01S 17/93* | (2020.01) | |
| *G01S 7/48* | (2006.01) | |
| *G01S 7/481* | (2006.01) | |
| *G01S 7/484* | (2006.01) | |
| *G01S 17/04* | (2020.01) | |
| *G01S 7/499* | (2006.01) | |
| *G01S 17/89* | (2020.01) | |
| *G01S 17/74* | (2006.01) | |
| *G01S 17/931* | (2020.01) | |
| *G01S 17/00* | (2020.01) | |

(52) U.S. Cl.
CPC .......... *G01S 17/04* (2020.01); *G01S 7/4802* (2013.01); *G01S 7/484* (2013.01); *G01S 7/4808* (2013.01); *G01S 7/4816* (2013.01); *G01S 7/499* (2013.01); *G01S 17/74* (2013.01); *G01S 17/89* (2013.01); *G01S 17/93* (2013.01); *G01S 17/931* (2020.01); *G01S 17/003* (2013.01)

(58) Field of Classification Search
CPC ........ G01S 17/04; G01S 7/4816; G01S 7/484; G01S 7/4802; G01S 7/4808; G01S 17/93; G01S 7/499; G01S 17/89; G01S 17/74; G01S 17/931; G01S 17/003
USPC ....................................................... 356/4.07
See application file for complete search history.

(56) References Cited

U.S. PATENT DOCUMENTS

| | | |
|---|---|---|
| 5,243,185 A | 9/1993 | Blackwood |
| 5,500,530 A | 3/1996 | Gregoris |

(Continued)

FOREIGN PATENT DOCUMENTS

| | | |
|---|---|---|
| EP | 3045936 A1 | 7/2016 |
| EP | 3067713 A1 | 9/2016 |

OTHER PUBLICATIONS

EESR issued Oct 8, 2020 for EP application 18745475.6.

*Primary Examiner* — Daniel L Murphy
(74) *Attorney, Agent, or Firm* — R'Sue Popowich Caron

(57) ABSTRACT

A system for enhanced object detection and identification is disclosed. The system provides new capabilities in object detection and identification. The system can be used with a variety of vehicles, such as autonomous cars, human-driven motor vehicles, robots, drones, and aircraft and can detect objects in adverse operating conditions such as heavy rain, snow, or sun glare. Enhanced object detection can also be used to detect objects in the environment around a stationary object. Additionally, such systems can rapidly identify and classify objects based on the encoded information in the emitted or reflected signals from the materials.

15 Claims, 21 Drawing Sheets

(56) References Cited

U.S. PATENT DOCUMENTS 5,902,998 A 5/1999 Olson et al.
6,798,514 B2 9/2004 Daniels

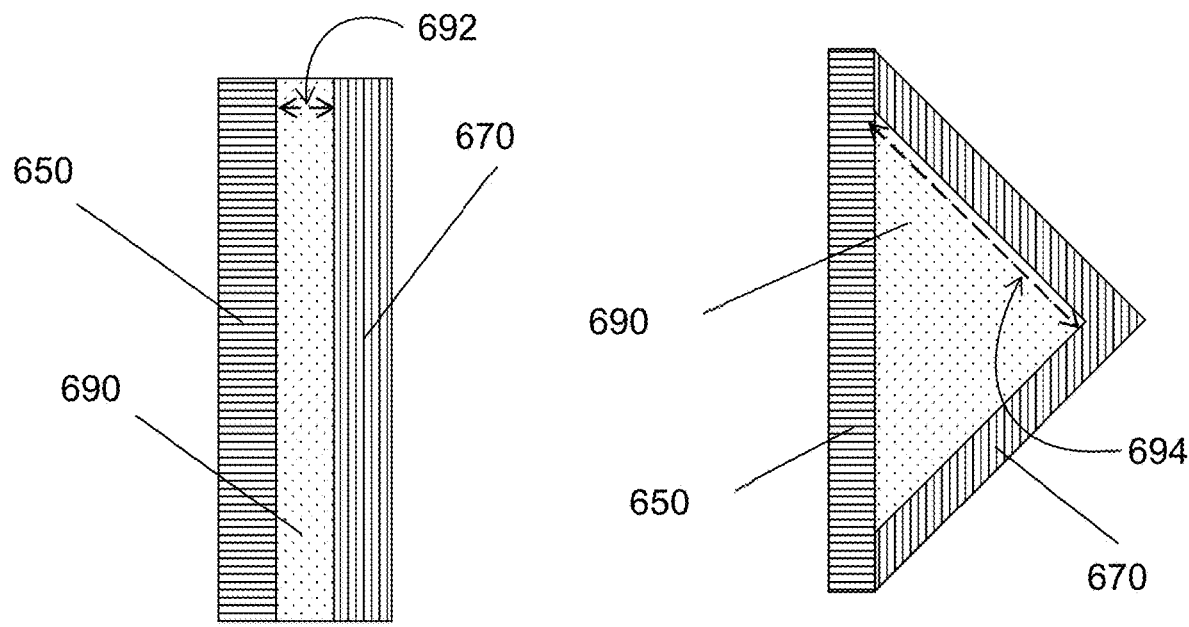
FIG. 6A
FIG. 6B
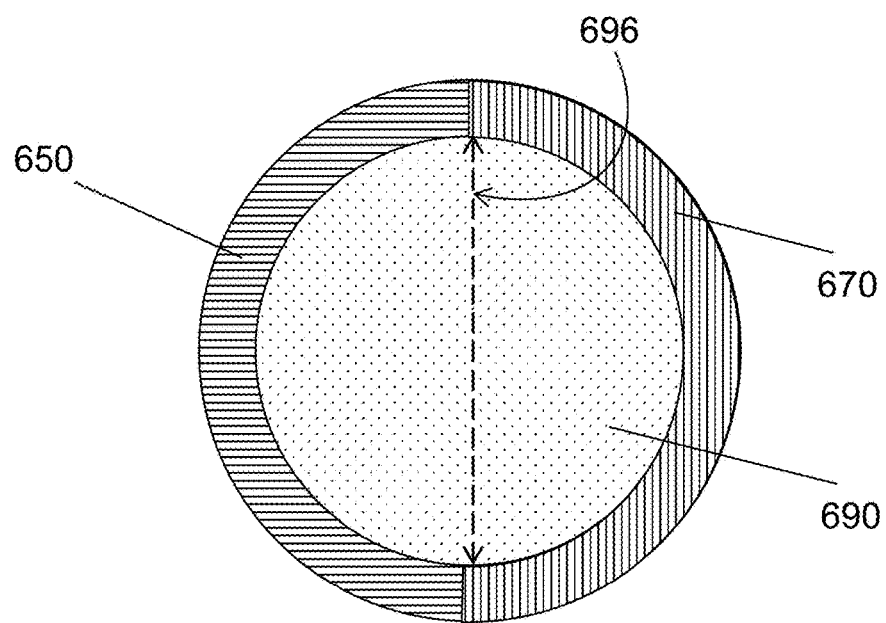
FIG. 6C

US 10,908,281 B2

SYSTEM FOR OBJECT DETECTION

CROSS-REFERENCE TO RELATED APPLICATIONS

This application claims priority to U.S. Provisional Patent Application 62/450,669, filed Jan. 26, 2017, U.S. Provisional Patent Application 62/452,349, filed Jan. 30, 2017, U.S. Provisional Patent Application 62/508,391, filed May 19, 2017, and U.S. Provisional Patent Application 62/508,392, filed May 19, 2017, all of which are incorporated by reference herein.

BACKGROUND OF THE INVENTION

Field of the Invention

This disclosure relates generally to object detection systems and components. More specifically, the embodiments disclosed herein relate to infrared (IR) signal detecting devices and systems used for object perception by stationary platforms or mobile platforms such as autonomous vehicles.

Some vehicles are configured to operate in an autonomous mode in which the vehicle navigates through an environment with little or no input from a driver. Such vehicles typically have one or more sensors that are configured to sense information about the environment. A vehicle may use such information to navigate through the environment and avoid collisions.

Heretofore the information obtained by such sensing systems has been limited. While some current technologies may be able to detect a nearby object, it has not been possible to know much about the characteristics of such an object.

It would be useful to develop detection systems for enhanced object detection classification so that characteristics of nearby objects may also be distinguished to make a more detailed identification of a surrounding environment.

SUMMARY

In one embodiment of the invention, a platform for an enhanced object detection system is disclosed. The platform includes a source of electromagnetic radiation; a first modulator in communication with the source of electromagnetic radiation; and a detector module communicatively coupled to the enhanced object detection system, the detector module comprising one or more detectors receptive to outputs from the first modulator; and a computing system comprising non-transitory computer readable media and communicatively coupled to the source of electromagnetic radiation and to the detector module. The platform is operable in a detection mode wherein: the source of electromagnetic radiation emits a source signal toward the first modulator; the first modulator transforms the source signal into a returned signal, wherein the returned signal includes a modification of at least one characteristic of the source signal, the characteristic selected from the group consisting of polarization state, wavelength, phase, intensity, and direction; the first modulator emits the returned signal; the detectors in the detector module detect a portion of the returned signal; and the computing system makes comparisons between the source signal and the portion of the returned signal, generates a characterization of the modification, and provides an identification of the first modulator based on the characterization. In some arrangements, a portion of any electromagnetic radiation signal can range from 1% to 100%, or any range subsumed therein.

In some arrangements, the source of electromagnetic radiation and the detector module are co-located. In some arrangements, the source of electromagnetic radiation and the first modulator are co-located. In some arrangements, the source signal comprises one or more wavelengths between 0.25 µm and 15 µm. In some arrangements, the source signal is polarized. In some arrangements, the source signal comprises a series of subsignals, and the subsignals are emitted sequentially. The subsignals may all have the same characteristics, as listed above, or some or all of the subsignals may have different characteristics, as listed above.

In some arrangements, the first modulator includes one or more of water, ice, snow, asphalt, and concrete.

In some arrangements, the first modulator includes a reflector (or retroreflector). The reflector may have a coating that is transparent to the source signal. The coating may include one or more of chiral materials, birefringent materials, nonlinear optical materials, and fluorescent materials.

In some arrangements, the detector module includes at least one electromagnetic radiation detector such as a charge-coupled device, a CMOS sensor, a quantum well detector, or a quantum dot detector. The detector module may further include a filter in communication with the electromagnetic radiation detector. The filter may include one or more of metal wires, birefringent materials, chiral materials, plasmonic metals, nonlinear optical materials, and fluorescent materials. In some arrangements, the filter includes one or more of metal wires, metal nanoparticles, and liquid-crystal-based materials, and the characteristics of the filter are modulated by application of an electric field from an electric field source in communication with the filter.

In some arrangements, a filter in communication with an electromagnetic radiation detector, i.e., a filter coupled to an electromagnetic radiation detector, transmits a first portion of the returned signal to the electromagnetic radiation detector. The first portion has a first characteristic such as wavelength, polarization, and/or phase.

In some arrangements, a first filter is in communication with a first electromagnetic radiation detector, and a second filter is in communication with a second electromagnetic radiation detector. The first filter transmits a first portion of the returned signal to the first electromagnetic radiation detector, and the second filter transmits a second portion of the returned signal to the second electromagnetic radiation detector. The first portion has a first characteristic such as wavelength, polarization, and/or phase; the second portion has a second characteristic such as wavelength, polarization, and/or phase; and the first characteristic and the second characteristic are different. In some arrangements, the first characteristic differs from the second characteristic in the kind of characteristic, i.e., the first characteristic is a particular wavelength and the second characteristic is a particular polarization. In some arrangements, the first characteristic differs from the second characteristic within the same kind of characteristic, i.e., the first characteristic is a first wavelength, and the second characteristic is a second wavelength different from the first wavelength.

In some arrangements, a first filter and a third filter are both in communication with a first electromagnetic radiation detector. The first filter transmits a first portion of the returned signal to the first electromagnetic radiation detector, and the third filter transmits a third portion of the returned signal to the first electromagnetic radiation detector. The first portion has a first characteristic such as wavelength, polarization, and/or phase; the third portion has a third characteristic such as wavelength, polarization, and/or phase; and the first characteristic and the third characteristic are different. In some arrangements, the first characteristic differs from the third characteristic in the kind of characteristic, i.e., the first characteristic is a particular wavelength and the third characteristic is a particular polarization. In some arrangements, the first characteristic differs from the third characteristic within the same kind of characteristic, i.e., the first characteristic is a first wavelength, and the third characteristic is a third wavelength different from the first wavelength.

In some arrangements, when filters are used with detectors, as described above and when the platform is operable in a detection mode, the computing system makes a first comparison between the source signal and the first portion of returned signal; makes a second comparison between the source signal and the second portion of the returned signal; and uses the first comparison, and the second comparison to generate a characterization of the modification and to provide an identification of the first modulator based on the characterization.

In some arrangements, when filters are used with detectors, as described above and when the platform is operable in a detection mode, the computing system makes a first comparison between the source signal and the first portion of returned signal; makes a second comparison between the source signal and the second portion of the returned signal; makes a third comparison between the first portion of the returned signal and the second portion of the returned signal; and uses the first comparison, the second comparison, and the third comparison to generate a characterization of the modification and to provide an identification of the first modulator based on the characterization.

In another embodiment of the invention, a platform for an enhanced object detection system includes a source of infrared radiation; a first modulator in communication with the source of infrared radiation, the first modulator comprising a reflector; and a detector module communicatively coupled to the enhanced object detection system, the detector module comprising one or more detectors receptive to outputs of the first modulator; and a computing system communicatively coupled to the source of infrared and to the detector module The platform is operable in a detection mode wherein the source of infrared radiation emits a source signal toward the first modulator; the first modulator transforms the source signal into a returned signal, wherein the returned signal includes a modification of at least one characteristic of the source signal, the characteristic selected from the group consisting of polarization state, wavelength, and intensity; the first modulator emits the returned signal; the detectors in the detector module detect a portion of the returned signal; and the computing system makes comparisons between the source signal and the portion of the returned signal, generates a characterization of the modification, and provides an identification of the first modulator based on the characterization.

In another embodiment of the invention, any of the platforms described here can be customized to detect an ice layer on a substrate. Such a platform includes a source of infrared radiation; an ice layer on a substrate acting as a first modulator and in communication with the source of infrared radiation; and a detector module communicatively coupled to the enhanced object detection system, the detector module comprising two detectors receptive to outputs of the first modulator; and a computing system communicatively coupled to the source of infrared and to the detector module.

The platform is operable in a detection mode wherein the source of infrared radiation emits an source signal that has a first elliptical polarization toward the first modulator; the first modulator transforms the source signal into a returned signal, wherein the returned signal has a modification that includes at least a second elliptical (or other) polarization; the first modulator emits the returned signal; a first detector in the detector module communicatively coupled with a first filter that is configured to transmit a first portion of the returned signal that has the second polarization to the first detector, the first detector detects the first portion of the returned signal; a second detector in the detector module communicatively coupled with a second filter that is configured to transmit a second portion of the returned signal that has a preselected wavelength to the second detector, the second detector detects the second portion of the returned signal; and the computing system makes comparisons among the source signal, the first portion of the returned signal and the second portion of the returned signal, generates a characterization of the modification, and, based on the characterizations, provides confirmation that the first modulator is the ice layer. In some arrangements, the computing system also generates an approximate thickness of the ice layer based on the characterizations.

In another embodiment of the invention, a system for enhanced object detection is disclosed. The system includes a source of electromagnetic radiation configured to emit a source signal; a first modulator configured to receive the source signal and to make a modification to the source signal in order to create and transmit a returned signal; a detector module configured to detect the returned signal; and a computer processor comprising non-transitory computer readable media, the computer processor configured to compare the returned signal to the source signal to determine the modification that was made by the first modulator and to identify the first modulator by correlating the modification with a list of known modulators and their modification properties. In some arrangements, the modification to the source signal is a change to one or more of the polarization state, wavelength, phase, intensity, and/or direction.

In some arrangements, the detector module includes one or more electromagnetic radiation detectors. At least one of the detectors may be coupled to a wave guide, and the wave guide is configured to guide the returned signal to the detector. Any wave guide may be configured to guide the returned signal to one or more detectors.

In some arrangements, the detector module includes one or more electromagnetic radiation detectors. At least one of the detectors may be coupled to an intensity regulator, and the intensity regulator is configured to adjust the intensity of the modified signal that is transmitted to the detector to an intensity between about 0% and 200% of the original modified signal.

In some arrangements, the modulator is an ordinary object, such as people, vehicles, clothing, flora, fauna, road materials, road demarcations, signs, and roadway surface conditions such as ice, snow, shallow water, or deep water. In some arrangements, the modulator is an object whose modulation properties have been enhanced by addition of reflectors (or retroreflectors). In some arrangements, the reflector(s) include coating(s) configured to cause a modification, such as described above.

In another embodiment of the invention, a method of using an enhanced object detection system is disclosed. The method includes the steps of: providing a source of electromagnetic radiation configured to emit a source signal with a first characteristic; directing the source signal to first modulator; allowing the first modulator to receive the source signal and modify the first characteristic of the source signal to create a returned signal with a second characteristic different from the first characteristic; allowing the first modulator to emit the returned signal; providing a detector to receive the returned signal; and providing a computer processor to generate a characterization of the source signal and a characterization of the returned signal, to determine a change between the first characteristic and the second characteristic, and to identify the first modulator based on the change. In some arrangements, the first characteristic is polarization. In some arrangements, the first characteristic is wavelength. In some arrangements, the first characteristic is phase, intensity, and/or direction.

BRIEF DESCRIPTION OF THE DRAWINGS

The foregoing aspects and others will be readily appreciated by the skilled artisan from the following description of illustrative embodiments when read in conjunction with the accompanying drawings.

FIG. 6A is schematic cross-section illustration of a platelet reflector, according to an embodiment of the invention.

FIG. 6B is a schematic cross-section illustration of a cube retroreflector, according to an embodiment of the invention.

FIG. 6C is a schematic cross-section illustration of a spherical retroreflector, according to an embodiment of the invention.

DETAILED DESCRIPTION

Figure 1:
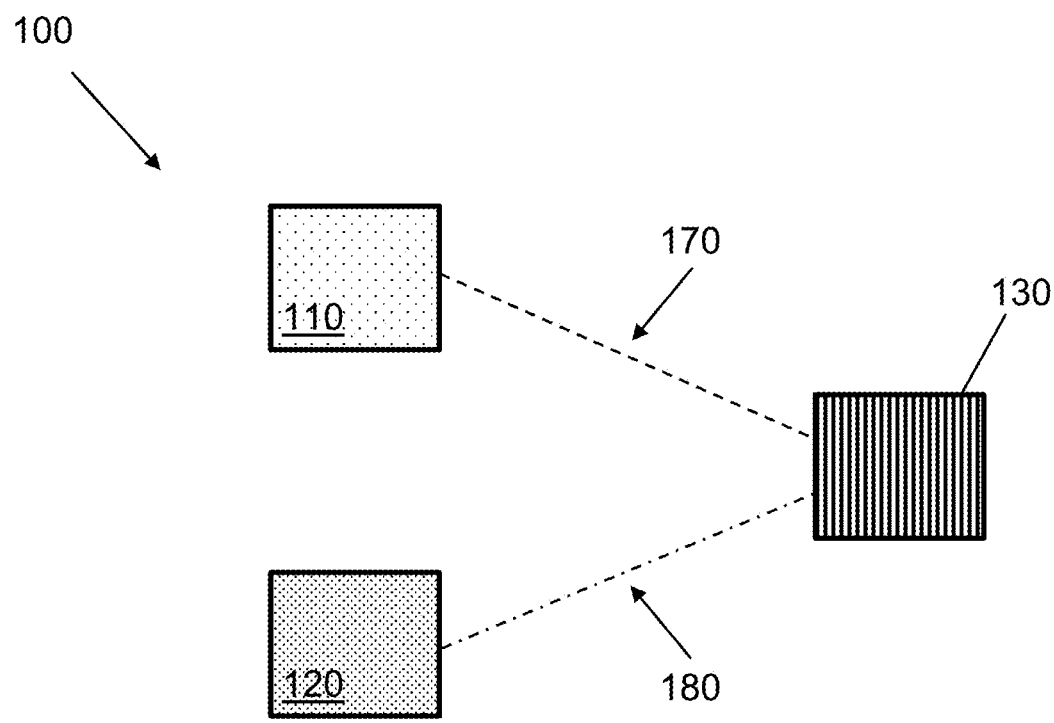
FIG. 1 is a schematic illustration that shows a system for enhanced object detection, according to an embodiment of the invention.

The embodiments of the invention are illustrated in the context of detecting nearby objects in a moving vehicle. The skilled artisan will readily appreciate, however, that the materials and methods disclosed herein will have application in a number of other contexts where object sensing is desirable, particularly where discerning particular characteristics of such objects is important.

These and other objects and advantages of the present invention will become more fully apparent from the following description taken in conjunction with the accompanying drawings.

All ranges disclosed herein are meant to include all ranges subsumed therein unless specifically stated otherwise. As used herein, "any range subsumed therein" means any range that is within the stated range.

All publications referred to herein are incorporated by reference in their entirety for all purposes as if fully set forth herein.

Definitions

The term "enhanced object detection" is used herein to mean the detection of an object and one or more additional attributes that enable specific classification and/or identification of the object. The term "to modulate" is used herein to mean to make a change in the properties of an electromagnetic radiation signal. Examples of modulation include, but are not limited to, reflection, redirection, wavelength shift, frequency shift, polarization change and intensity change. A material that effects modulation can be referred to as a "modulator". The term "to encode a signal" is used herein to mean to modulate a source electromagnetic radiation signal to produce a returned electromagnetic radiation signal in a predictable way. An "encoded signal" is a signal that has undergone such a modulation and contains encoded information about the object that produced the modulation.

The terms "electromagnetic radiation signal" and "signal" are used herein interchangeably to mean the same thing. A source signal is an electromagnetic radiation signal that is produced by a source module. When a source signal interacts with an object, it under goes a modulation. After such a source signal leaves an object it is called a returned signal, which is an electromagnetic radiation signal that has undergone a modulation through interaction with an object and contains encoded information.

The term "reflector" is used herein to include both simple reflectors and retroreflectors.

The embodiments of the invention, as disclosed herein describe systems and encoding materials for enhanced object detection. Such systems and encoding materials may be used with a variety of vehicles, such as autonomous cars, human-driven motor vehicles, robots, drones, and aircraft. Such systems may be used in conjunction with LIDAR, radar, camera, or other devices that may aid in detecting objects in the environment around a vehicle. In some arrangements, enhanced object detection can be used to detect objects in the environment around a stationary object such as to determine roadway conditions, to monitor traffic, to broadcast advisories, to locate robots or packages in warehouses or to find vehicles in parking lots or structures. Such systems may also be used with authentication or ticketing systems at points of entry such as theme parks, ski lifts, public transportation systems, or points of keyless entry. Such systems may also be used in location-based marketing or augmented reality systems to enable interaction between devices and objects. Such systems may be used to aid the vision-impaired or hearing-impaired in interacting with objects and navigating the environment. Such systems may also be used with smart weapons, for example, for positive target identification and friendly fire prevention. Such systems may also be used in retail applications to enable remote transaction authentication or purchases. Such systems may also be used in toys to enable interactivity between devices and objects. Such systems for enhanced object detection include various features, designs, and material configurations as described herein.

The embodiments of the invention, as described herein, provide new capabilities in object detection and identification. For example, the systems described herein can detect objects in adverse operating conditions such as heavy rain, snow, or sun glare. Additionally, in some arrangements, such systems can rapidly identify and classify objects such as obstacles or signs based on the encoded information in returned signals sent out from the materials. These and other advantages and features, are described in more detail in conjunction with the below description and attached figures.

FIG. 1 is a schematic illustration that shows a system 100 for enhanced object detection, according to an embodiment of the invention. The system 100 includes a source module 110 that can emit a source electromagnetic radiation signal 170 and a detector module 120 that can receive a returned electromagnetic radiation signal 180. The source module 110 and the detector module 120 may be in different locations, as shown in FIG. 1. In one arrangement, the source module 110 and the detector module 120 are in the same location. In some arrangements, the source module 110 and the detector module 120 are on the same or different mobile platforms. In some arrangements, the source module 110 and the detector module 120 are on the same or different stationary platforms. In some arrangements, the source module 110 is on a mobile platform and the detector module 120 is on a stationary platform. In some arrangements, the source module 110 is on a stationary platform and the detector module 120 is on a mobile platform.

The source electromagnetic radiation signal 170 illuminates an object 130. The object 130 interacts with the source electromagnetic radiation signal 170, acting as a modulator that modifies some of the characteristics of the signal and sends out a returned electromagnetic radiation signal 180. In some arrangements, materials and/or structures are added to an object of interest to effect or enhance such modulation or modification(s), as is discussed in more detail below. The modification in the signal that has been made by the object 130 may be simple or complex. Such a signal modification may include some or all of direction (e.g., simple reflection or redirection), intensity, polarization state, and wavelength. Such a system 100 may also include a computer processor (not shown) that is configured to compare the source electromagnetic radiation signal 170 to the returned electromagnetic radiation signal 180 in order to determine the modification that has been made by the object 130. The computer processor may be further configured to identity the object by correlating the modification in the signal with a list of known modulators and their signal modification properties. The source electromagnetic radiation signal 170 and the returned electromagnetic radiation signal 180 may each include a simple signal that has one wavelength and may or may not be polarized or a complex signal that has a variety of wavelengths and polarizations. The source electromagnetic radiation signal 170 and the returned electromagnetic radiation signal 180 may each be continuous or pulsed.

In one arrangement, the source module 110 and the object 130 are located together. The source electromagnetic radiation signal 170 is created within the object 130, the object 130 modifies the source signal to create a returned electromagnetic radiation signal 180, and the returned signal is detected by the detector module 120.

In some embodiments of the invention, the source module, object, and detector module are in different locations. In some embodiments of the invention, there are a plurality of source module(s), object(s), and/or detector module(s). In some arrangements, the source module and the detector module are co-located and stationary relative to a stationary or mobile object. In some arrangements, the source module and detector module are co-located and mobile relative to a stationary or mobile object. In some arrangements, the source module, object, and detector module are all located at different locations, and each may be either mobile or stationary.

In one embodiment of the invention, the source module is co-located with an object, the detector module is in a different location, and the source module/object location and the detector module location may both be stationary or may be moving relative to one another. The source module emits a source electromagnetic radiation signal that is modified by the co-located object, and the object sends out the returned signal to be received by the detector module. In this way, it can be said that the object is actively communicating encoded information to the detector module.

In one arrangement (not shown), the detector module 120 and/or the object 130 also have a protective coating on their exterior(s). The protective coating does not adversely affect the operation of the system.

In one arrangement, the source electromagnetic radiation signal 170 is configured to scan across a wide area to interact with many surrounding objects 130.

Source Module

The source module is configured to emit a source signal. In some arrangements, the source signal is an electromagnetic radiation signal. In some arrangements, the actual source of the electromagnetic radiation is a laser, LED, or light bulb. In some arrangements, an antenna is used to direct or focus the source electromagnetic radiation signal. Such source electromagnetic radiation signals can be emitted with a variety of characteristics. In some arrangements, the source module emits, in sequence, a series of source signals with different wavelengths. In some arrangements, the source signal includes multiple sub signals with different wavelengths. In various examples, the source electromagnetic radiation signal may be focused or unfocused; it may be polarized or non-polarized; and/or it may contain a single discrete wavelength, multiple discrete wavelengths, or one or more bands of wavelengths. The polarization may be linear, circular, or any combination thereof. In various embodiments of the invention, the source electromagnetic radiation signal wavelength(s) are in the infrared (IR) range, near IR range, far IR range, visible light range, microwave range or combinations thereof. In various embodiments of the invention, the wavelength of the source electromagnetic radiation signal ranges between 0.25 µm and 15 µm, between 0.7 µm and 15 µm, or between 0.7 µm and 2 µm. When using the system for enhanced object detection in atmospheric and moist environments, it may be useful to choose source electromagnetic radiation signals from the above ranges with wavelengths that are not easily absorbed by air or water.

In some arrangements, the source signal contains density waves or acoustic waves and is used in conjunction with one or more detectors configured to detect such waves.

Ordinary Objects

In one embodiment of the invention, a source electromagnetic radiation signal with unique characteristics (e.g., polarization, wavelength, phase, intensity) can be used to detect, perceive and classify objects, both natural and man-made, i.e., "ordinary objects", in the surrounding environment.

Objects may include, but are not limited to, people, vehicles, clothing, flora, fauna, road materials, road demarcations, signs, and roadway surface conditions such as ice, snow, shallow water, or deep water. The reflection, redirection, emission, or stimulated emission (fluorescence) of returned signals may have unique patterns (e.g., polarization, polarization shift, wavelength, wavelength shift, phase, time delay, or intensity as described above) which can make it possible to identify of the object that sent the returned signal.

In adverse environmental conditions, the systems described herein can be used to determine roadway surface conditions. For example, dry pavement, standing water, and ice or snow each respond to a source signal with a returned signal that has a different polarization and wavelength characteristic. In addition, returned signals from two or more surfaces (e.g., a layer of ice on pavement) may provide information about the thickness or shape of the ice layer as well as the identification of the type of ice itself. For example, smooth black ice produces a returned signal that is different from the return signal produces by rough frost, rime ice, or compact snow. Furthermore, different thicknesses of ice or snow absorb, attenuate, and alter wavelength and polarization characteristics in the source signal in different ways to produce unique returned signals that carry information about the thicknesses.

Encoded Objects

In another embodiment of the invention, objects can be labelled with encoding materials to aid in their identification. Some kinds of ordinary objects may modify a source electromagnetic radiation signal in similar ways, which can make it difficult for a detector module and computer processor to differentiate among such objects and make appropriate identifications. It can be useful to "encode" some objects by adding encoding materials with known modulation properties to the surfaces of the object surfaces with coatings or by attaching particles or substructures. For example, surfaces of street signs or location signs could include encoding materials that are specific to the kind of street sign or to the location. In another example, paint on road surfaces could include coding materials that are specific to the meaning of the paint, e.g., center line, shoulder line, stop line. Each encoding material modifies an electromagnetic radiation signal in a specific way that can be detected by a detector module. Lists of objects and their associated encoding material(s) are stored in memory. A computer processor can identify the kind of encoding material and object with which it is associated. Such a system is very sensitive, fast, and reliable.

Figure 2:
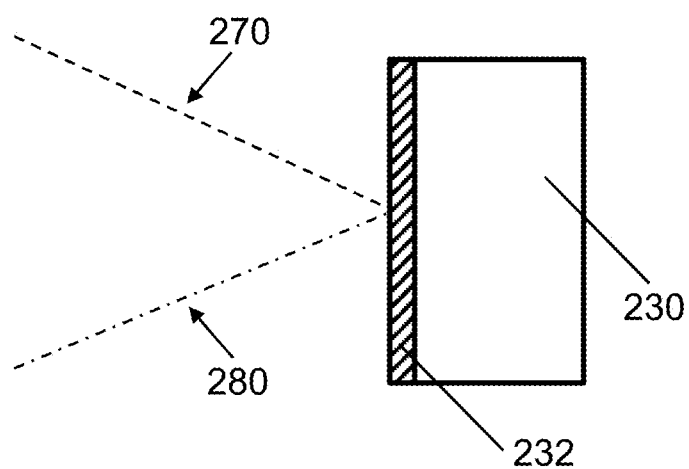
FIG. 2 is a schematic illustration of an object that has been encoded with a front coating, according to an embodiment of the invention.

FIG. 2 is a schematic illustration of an object 230 that has been encoded with a front coating 232 on a side of the object 230 that faces a source electromagnetic radiation signal 270, according to an embodiment of the invention. The front coating 232 may be continuous or it may be discontinuous. The source electromagnetic radiation signal 270 from a source module (not shown) illuminates the coating 232, which acts as a modulator that modifies some of the characteristics of the signal 270 and sends out a returned electromagnetic radiation signal 280. There may be additional signals that result from interaction between a portion of the source electromagnetic radiation signal 270 and the object itself 230.

Figure 3:
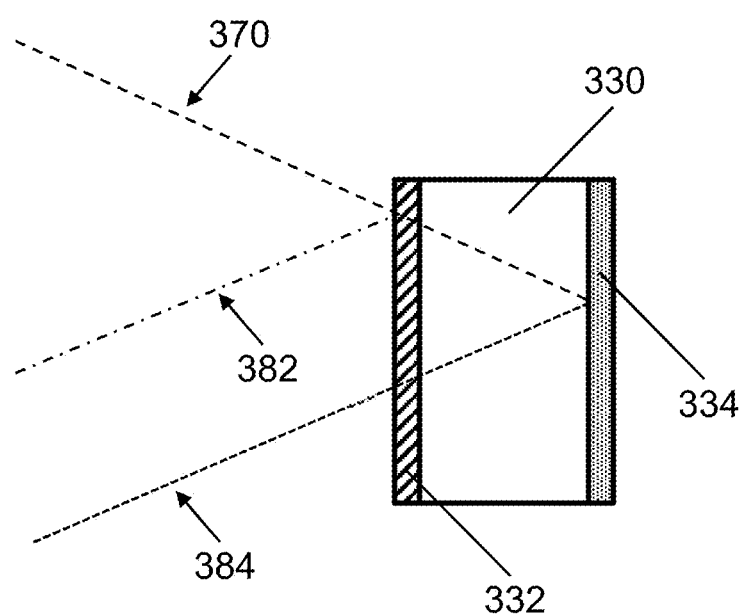
FIG. 3 is a schematic illustration of an object that has been encoded with a front coating and a back coating, according to an embodiment of the invention.

FIG. 3 is a schematic illustration of an object 330 that has been encoded with a front coating 332 on a front side of the object 330 that faces a source electromagnetic radiation signal 370 and a back coating 334 on a back side opposite the front side, according to an embodiment of the invention. The front coating 332 and the back coating 334 may be the same, or they may be different. The front coating 332 and the back coating 334 may both be continuous, may both be discontinuous, or one may be continuous and the other discontinuous. In some arrangements (not shown), there can be multiple front and/or back coatings, each containing a different material. In one embodiment of the invention, the source electromagnetic radiation signal 370 from a source module (not shown) illuminates the front coating 332, which acts as a modulator that modifies some of the characteristics of the source electromagnetic radiation signal 370 and sends out a first returned electromagnetic radiation signal 382. In some arrangements, a portion of the source electromagnetic radiation signal 370 travels through the front coating 332 and through the object 330 to illuminate the back coating 334, which acts as a modulator that modifies some of the characteristics of the source electromagnetic radiation signal 370 and sends out a second returned electromagnetic radiation signal 384. The first returned electromagnetic radiation signal 382 and the second returned electromagnetic radiation signal 384 may provide information about the front coating 332 and the back coating 334, respectively. The first returned electromagnetic radiation signal 382 and the second returned electromagnetic radiation signal 384 together may also provide information about the object itself such as its thickness, shape, or orientation. There may be additional returned signals that result from interaction between a portion of the source electromagnetic radiation signal 370 and the object 330.

Figure 4:
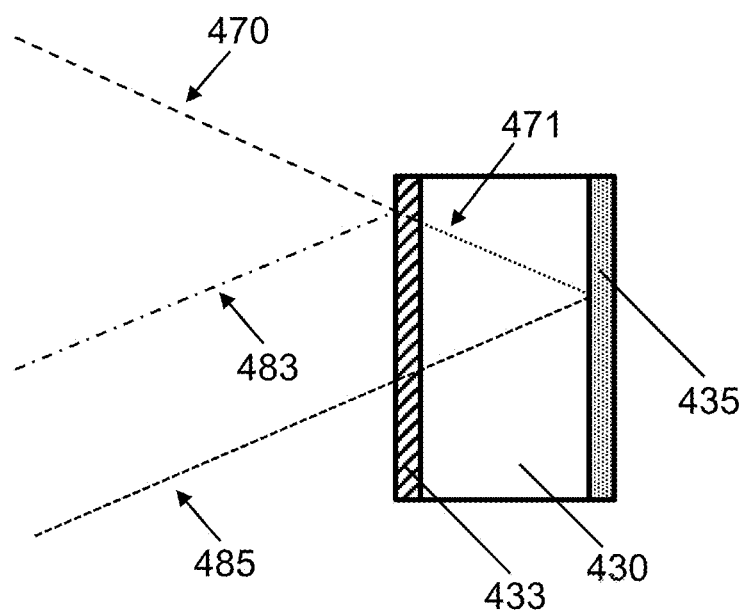
FIG. 4 is a schematic illustration of an object that has been encoded with a front coating and a back coating, according to another embodiment of the invention.

FIG. 4 is a schematic illustration of an object 430 that has been encoded with a front coating 433 on a front side of the object 430 that faces a source electromagnetic radiation signal 470 and a back coating 435 on a back side opposite the front side, according to an embodiment of the invention. The front coating 433 and the back coating 435 are not the same. The front coating 433 and the back coating 435 may both be continuous, may both be discontinuous, or one may be continuous and the other discontinuous. In one embodiment of the invention, the source electromagnetic radiation signal 470 from a source module (not shown) illuminates the front coating 433. In some arrangements, the front coating 433 acts as a modulator that modifies some of the characteristics of the source electromagnetic radiation signal 470 and sends out a first returned electromagnetic radiation signal 483. In some arrangements, little or no first returned electromagnetic radiation signal 483 is sent out from the front coating 433. In some arrangements, source electromagnetic radiation signal 470 changes to a secondary source electromagnetic radiation signal 471 as it passes through the front coating 433 as a result of filtering or alteration of the source electromagnetic radiation signal 470. At least a portion of the secondary source electromagnetic radiation signal 471 passes through the object 430 to illuminate the back coating 435, which acts as a modulator that modifies some of the characteristics of the secondary source electromagnetic radiation signal 471 and sends out a second returned electromagnetic radiation signal 485. The first returned electromagnetic radiation signal 483 and the second returned electromagnetic radiation signal 485 may provide information about the front coating 433 and the back coating 435, respectively. The first returned electromagnetic radiation signal 483 and the second returned electromagnetic radiation signal 485 together may also provide information about the object itself such as its thickness, shape, or orientation. There may be additional filtering or altering effects on the secondary source electromagnetic radiation signal 471 as it passes through the object 430. There may be additional returned signals that result from interaction between the secondary source electromagnetic radiation signal 471 and the object 430.

The front coating 433 may allow transmission of only particular wavelengths in a multi-wavelength source electromagnetic radiation signal 470. In some arrangements, the front coating 433 is carefully chosen to transmit only signature wavelengths which the back coating 435 is specifically designed to modify. The front coating 433 may cause shifting of wavelength(s) in a source electromagnetic radiation signal 470 to longer or shorter wavelengths. In some arrangements, the front coating 433 is carefully chosen to change wavelength(s) in the source electromagnetic radiation signal 470 to match wavelength(s) which the back coating 435 is specifically designed to modify. The front coating 433 may change the polarization of the source electromagnetic radiation signal 470. In some arrangements, the front coating 433 is carefully chosen to transmit only particular polarization states which the back coating 435 is specifically designed to modify.

Figure 5:
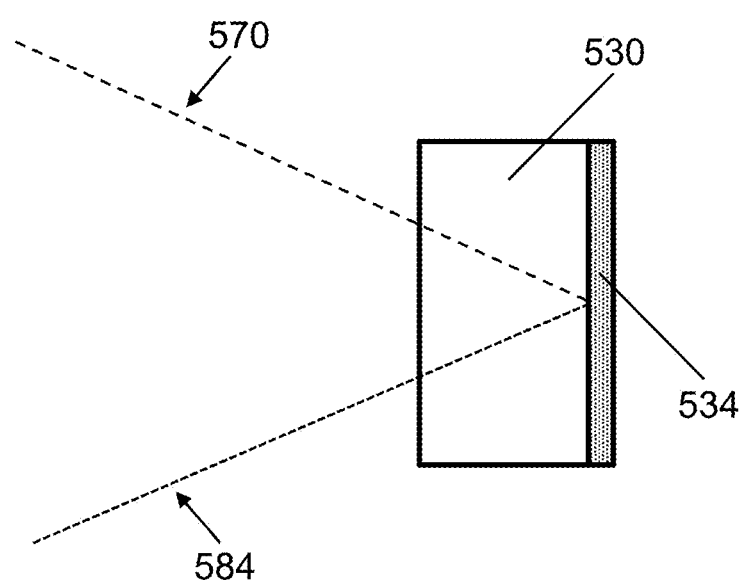
FIG. 5 is a schematic illustration of an object that has been encoded with a back coating, according to an embodiment of the invention.

FIG. 5 is a schematic illustration of an object 530 that has been encoded with a back coating 534 on a (back) side of the object 530, which faces away from a source electromagnetic radiation signal, according to an embodiment of the invention. At least a portion of the source electromagnetic radiation signal 570 travels through the object 530 to illuminate the back coating 534, which acts as a modulator that modifies some of the characteristics of the source electromagnetic radiation signal 570 and sends out a returned electromagnetic radiation signal 584. There may be additional returned signals that result from interaction between a portion of the source electromagnetic radiation signal 570 and the object 530.

In some arrangements, the coatings described above with reference to FIGS. 2-5 include only one material layer. Such coatings have thicknesses that range from about 10 nm to 100 μm or from about 200 nm to 1 μm. In some arrangements, the coatings described above with reference to FIGS. 2-5 include multiple different material layers, each of which has its own unique properties for modification of a source electromagnetic radiation signal. In some arrangements, such coatings contain from 2 to 100 layers. In some arrangements, such coatings contain between 3 and 10 layers. In some arrangements, the total thickness in such a multilayer coating ranges from 50 nm to 100 μm or from 200 nm to 1 μm. Individual layers within a multilayer coating may be continuous or discontinuous. In some arrangements, an individual layer has a thickness between 30 nm and 200 nm. In some arrangements, the spacing between discontinuous regions is between 30 nm and 200 nm.

The examples in FIGS. 2-5 show objects with very simple shapes. Objects with complex shapes that have many surfaces may be encoded with a variety of coatings on more than two surfaces.

Encoding Materials

In one arrangement, objects are encoded with layers of material that can modify a source electromagnetic radiation signal as described above. In one arrangement, such material layers contain reflectors, which may be simple reflectors, retroreflectors, or combinations thereof. In some arrangements, small reflectors are applied directly to an object by pressing or gluing. In some arrangements, small reflectors are incorporated into a plate, tape, fabric, or string, which is then applied to an object. In some arrangements, small reflectors are mixed with a liquid or gel to form a paint, and the paint is applied to an object, such as by brushing or spraying. Small reflectors may also be mixed with a gas and sprayed onto an object. Making such mixtures with liquids, gels, or gases would be easily understood by a person of ordinary skill in the art.

In some arrangements, reflectors are used in a liquid formulation that may solidify after application on an object or surface or that may stay in a liquid or a gel phase. Example of carrier and formulation materials are solvents, polymers with solvents, polymers, liquid organic or inorganic materials such as liquid crystals, cross linkable materials, surfactants but not limited to these. Gas phase carrier materials may enable the application of the substructures or particles to surfaces or distribute them on larger areas. Carriers can include non-pressurized or pressurized air, other nonreactive gases such as nitrogen, argon or reactive gases such as hydrogen or fluorine. The formulation may form a solid state or liquid phase after application. Some examples of materials for the described formulations include, but are not limited to, binders including synthetic or natural resins such as alkyds, acrylics, vinyl-acrylics, vinyl acetate/ethylene, polyurethanes, polyesters, melamine resins, epoxy, silanes, siloxanes, oils, organic and inorganic solvents such as water as the main diluent for water-borne paints, or even for the co-solvent types. Solvent-borne, also called oil-based, formulations may have various combinations of organic solvents as the diluent, including aliphatics, aromatics, alcohols, ketones and white spirit. Specific examples are organic solvents such as petroleum distillate, esters, glycol ethers, and the like. Sometimes volatile low-molecular weight synthetic resins also serve as diluents. Fillers may include inert materials, such as diatomaceous earth, talc, lime, barytes, or color pigments.

FIGS. 6A, 6B, and 6C are schematic cross-section illustrations of three different kinds of reflectors, according to an embodiment of the invention. FIG. 6A shows a platelet reflector, FIG. 6B shows a cube retroreflector, and FIG. 6C shows a spherical retroreflector. All three reflectors have a front coating 650, a back coating 670, and an interior volume 690. Within any one region 650, 670, 690, there may be only one or there may be many different layers and materials. A source electromagnetic radiation signal penetrates through the front coating 650 and the interior volume 690, is reflected off the back coating 670, passes through the interior volume 690 and the front coating 650 and is sent off from the reflector as a returned signal. In some arrangements, the interior volumes 690 each has a critical dimension, indicated as 692, 694, and 696 for FIGS. 6A, 6B, and 6C, respectively, and the critical dimension is between 0.05 um and 5 mm or between 2 um and 500 um.

The path that the source signal follows through the reflector depends on the angle at which the source signal enters the reflector. Different paths result in different modulations of the source signal. The angle dependency may be used not only to encode the object but also to determine the direction, shape, and orientation of the object. Reflection through the platelet reflector in FIG. 6A is relatively simple. But a source signal can undergo multiple reflections within the cube retroreflector in FIG. 6B. Through careful selection of materials for the front coating 650, the back coating 670, and the interior volume 690 of a cube retroreflector, a desired modulation can be achieved, increasing sensitivity for detecting direction as well as shape and orientation the object.

The spherical shaped retroreflector in FIG. 6C is designed to increase the intensity of the source signal and to send that increased intensity out in the returned signal. Unlike for the platelet reflector and the cube retroreflector, the source signal is guided to one reflection point on the back coating 670, reducing the angular dependency of any modulation achieved in the spherical retroreflector. This can be especially useful where modulation as a function of the angle of incidence of the source electromagnetic radiation signal on the reflector is not desired.

Any one or more of the front coating 650, the back coating 670, and the interior volume 690 may introduce a modulation into the source electromagnetic radiation signal to form a returned signal. At least one of the front coating 650, the back coating 670, and the interior volume 690 reflects the source electromagnetic radiation signal.

Materials for Changing Polarization

In some embodiments of the invention, materials that cause a change in polarization between a source electromagnetic radiation signal and a returned signal, such as birefringent materials or chiral materials, are used to encode objects either as direct coatings on the objects or as coatings on or to fill the volume of reflectors. Such materials can also to be used as filters over detectors to select for detection of only particular polarization characteristics in a returned signal. In one arrangement, birefringent materials have a birefringence number between 0.001 and 1. In one arrangement, chiral materials have a specific rotation between −3000 and 3000. In one arrangement, such materials are transparent or nearly transparent to the wavelength of the source electromagnetic radiation signal. In another arrangement, such materials are transparent over the entire range of electromagnetic radiation that can be used as a source signal, i.e., the infrared (IR) range, near IR range, far IR range, visible light range, and microwave range.

Examples of birefringent and chiral materials include, but are not limited to, tourmaline, calcite, quartz, sodium nitrate, rutile titanium oxides, nano lead sulfides, lead telluride, silicon, beryl, calomel, ice, lithium niobate, silicon oxides, aluminum oxide, iron oxides, peridot, sapphire, sodium nitrate, zircon. Other such materials include barium fluoride, cadmium telluride, calcium fluoride, cesium bromide, cesium iodide, chalcogenide glasses, fused silica, gallium arsenide, germanium, lithium fluoride, magnesium fluoride, cryolite, silicon oxides, cerium fluoride, silicon monoxide, zinc sulfide, bismuth oxides, germanium, lead fluoride, zirconium oxides, and titanium oxides. Other such materials include acrylic, polycarbonate, polycarbonate copolymer, rigid vinyl, poly IR materials (Fresnel technology), cellulose acetate, polyethyleneterephtalate and copolymers, polyethylenenaphtalate and copolymers, polymethylmethacrylate and copolymer, ethylenecycloolefines and copolymers, polymethylpentene, polypropylene, ethylene-tetrafluorethylene and copolymers, tetrafluorethylene-perfluoro-propylene and copolymers, perfluoro-alkoxy and copolymers, fluoro-alkoxy terpolymer, polyetheretherketone, polyetherimide, and polystyrene. Any of the materials listed here may have particular microstructures, such as crystalline, polycrystalline, columnar normal biaxial, columnar tilted biaxial, normal columnar uniaxial, normal columnar chiral, and combinations thereof. Other materials include indium-tin-oxide, magnesium di-borides and borides, and tellurium. Other materials include liquid crystals in nematic, smectic, or cholesteric phases.

Other such materials include plasmonic metals such as aluminum, silver, gold, nickel, copper, selenium, and composites and alloys thereof.

Materials for Wavelength Filtering

In some embodiments of the invention, materials that selectively absorb or selectively reflect an electromagnetic radiation signal are used to encode objects either as direct coatings on the objects or as coatings on or to fill the volume of reflectors. Such materials can also be used as filters over detectors to select for detection of only particular wavelengths in a returned signal. In one arrangement, an absorption coefficient for a desired wavelength is greater than 0.5. In one arrangement, reflectivity for a desired wavelength is greater than 0.5. When used as part of a multilayer filter, it is useful if such a material is also transparent to electromagnetic radiation that other layers are designed modify or detect.

Example of wavelength filtering materials include, but are not limited to, barium fluoride, cadmium telluride, calcium fluoride, cesium bromide, cesium iodide, chalcogenide glasses, fused silica, gallium arsenide, germanium, lithium fluoride, magnesium fluoride, cryolite, silicon oxides, cerium fluoride, silicon monoxide, zinc sulfide bismuth oxides, germanium, lead fluoride, zirconium oxides, and titanium oxides. Any of the materials listed here may be crystalline or polycrystalline. Any of the materials listed here may be undoped, or they may be doped with absorption centers.

Other such materials include acrylic, polycarbonate, polycarbonate copolymer, rigid vinyl, poly IR materials (Fresnel technology), cellulose acetate, polyethyleneterephtalate and copolymers, polyethylenenaphtalate and copolymers, polymethylmethacrylate and copolymer, ethylenecycloolefines and copolymers, polymethylpentene, polypropylene, ethylene-tetrafluorethylene and copolymers, tetrafluorethylene-perfluoro-propylene and copolymers, perfluoro-alkoxy and copolymers, fluoro-alkoxy terpolymer, polyetheretherketone, polyetherimide, and polystyrene. Any of the materials listed here may be undoped, or they may be doped with absorption centers.

Materials for Wavelength Shifting

In some embodiments of the invention, materials that change the wavelength of electromagnetic radiation are used to encode objects either as direct coatings on the objects or as coatings on or to fill the volume of reflectors. Such materials can also to be used as filters over detectors to select for detection of only particular frequencies in a returned signal.

Materials that shift the wavelength of electromagnetic radiation include nonlinear optical materials (NLO) and stimulated emission (fluorescent) materials. Nonlinear optical materials include, but are not limited to, chalcogenides, halides, and iodates. Examples of such nonlinear optical materials include, but are not limited to, barium borate, lithium iodate, potassium niobate, monopotassium phosphate, lithium triborate, β-barium borate, gallium selenide, potassium titanyl phosphate, lithium niobate, lithium iodate, and ammonium dihydrogen phosphate, potassium titanyl phosphate, and lithium niobite. Any of the materials listed here may in forms with particular microstructures, such as crystalline, polycrystalline, columnar normal biaxial, columnar tilted biaxial, normal columnar uniaxial, and combinations thereof.

Other materials that shift wavelength through stimulated emission (fluorescence) include lead sulfide, lead selenide, mesoporous silica, cadmium sulfide, cadmium selenide, cadmium telluride, indium phosphate, and zinc oxide. Any of the materials listed here may in forms with particular nanostructures, such as quantum dots or wires.

In addition to the materials described above, it is useful if the internal volume (690 in FIGS. 6A, 6B, and 6C) of a reflector is transparent to the source electromagnetic radiation signal wave length. In one arrangement, if a time delay is desired, an optical material in the internal volume (690 in FIGS. 6A, 6B, and 6C) of a reflector has refraction index higher than 2.

In some arrangements, materials selected for use as the back coating (670 in FIGS. 6A, 6B, and 6C) in a reflector coating selectively reflect the source electromagnetic radiation signal wave length. In some arrangements, metals such as aluminum, silver, gold, nickel, copper, or alloy thereof are used for the back coating. In some arrangements selenium composites or indium-tin-oxides are used for the back coating. In some arrangements, multilayer reflector structures are used to reflect specific wavelengths from the source signal. There may also be additional modulating layers on the object, and such layers may be interspersed among layers that reflect specific wavelengths.

Figure 7:
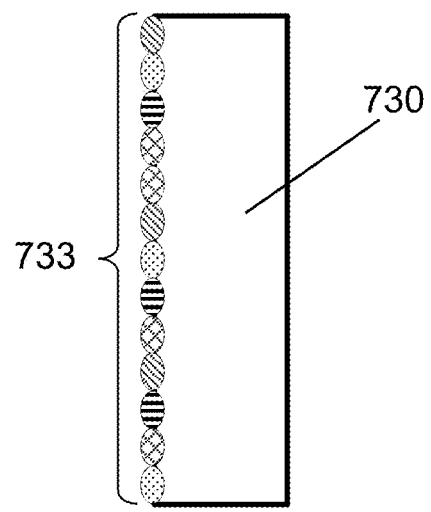
FIG. 7 is a schematic illustration of an object that has been encoded with four different kinds of reflector, according to an embodiment of the invention.

In one embodiment of the invention, any of the coatings described above in reference to FIGS. 2-5 may contain more than one kind of reflector, each of which is configured to provide a different modification to a source electromagnetic radiation signal. An example of the use of multiple kinds of retroreflectors is shown in the schematic drawing in FIG. 7. A coating 733 is shown on one side of an object 730. The coating contains four different kinds of retroreflector as indicated by the four different oval shadings in the coating 733. Each kind of retroreflector is configured to modify a source electromagnetic radiation signal in a different way. Types of signal modification have discussed in detail above.

Signal Modification

In various embodiments of the invention, modification of an electromagnetic radiation signal by an object may be a change in signal polarization, a change in wavelength(s), a change in phase, a change in intensity, a time delay, or any combination thereof.

Figure 8A:
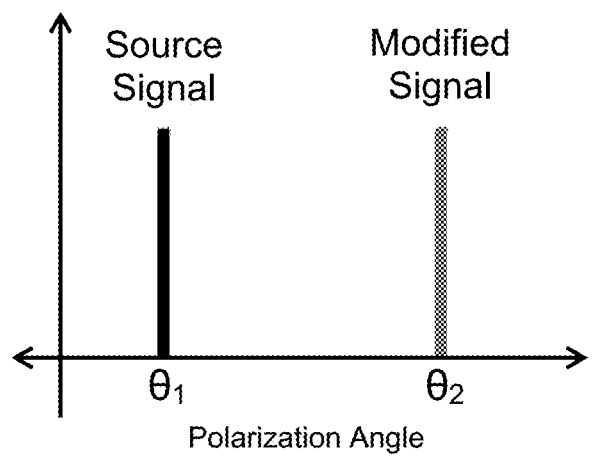
FIG. 8A shows an example of a modification in polarization of an electromagnetic radiation signal.
Figure 8B:
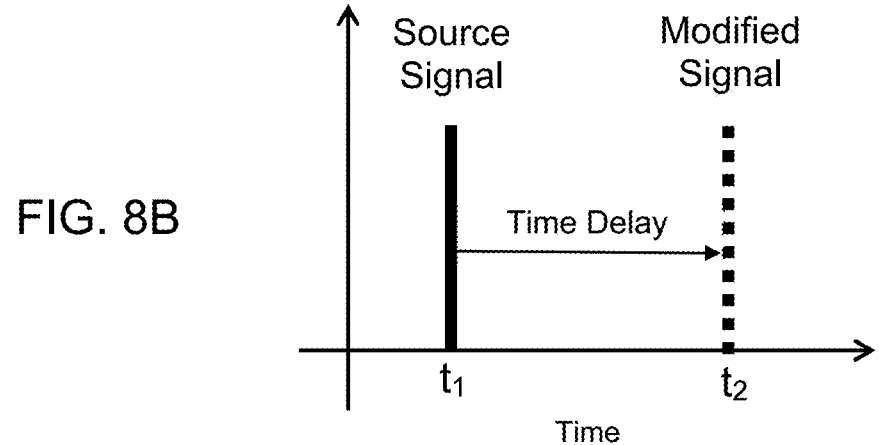
FIG. 8B shows an example of a modification in time delay of an electromagnetic radiation signal.
Figure 8C:
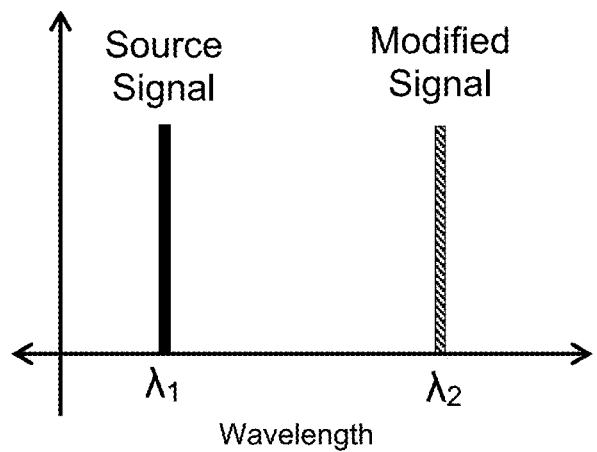
FIG. 8C shows an example of a modification in wavelength of an electromagnetic radiation signal.

FIGS. 8A, 8B, and 8C show three examples of electromagnetic radiation signal modification. FIG. 8A shows an example of a modification in polarization. A source signal has a polarization angle $\theta_1$, and, after the source signal interacts with an object, the object returns a modified signal with a polarization angle $\theta_2$. In one arrangement, angle $\theta_1$ is smaller than angle $\theta_2$. In another arrangement, angle $\theta_1$ is larger than angle $\theta_2$. The polarization of the source signal may be a linear polarization, a circular polarization, or an elliptical polarization. In some arrangements, the shift in polarization angle may be a shift from one linear polarization angle to another linear polarization angle in azimuth, from one elliptic polarization angle to another elliptic polarization angle in azimuth and ellipticity, or any combination thereof. In some arrangements, the type of polarization may also change, such as a change from linear to elliptic or to circular polarization.

FIG. 8B shows an example of a modification that is a time delay. Time delay is determined by measuring the time that elapses between the sending of the source signal and the receiving (by the detection module) of the returned modified signal. Of course, there is always elapsed time between the sending of the source signal and the receiving of the returned modified signal, but the amount of the elapsed time (the time delay) can provide information about the object that has created the modified signal. In particular, if a pulsed source signal is used, an object with a time delay modification in one or more layers may return multiple pulses at different times corresponding to the single source pulse that was sent. These delayed pulses can also be combined with additional modifications in polarization or wavelength to provide further complexity to the encoding.

FIG. 8C shows an example of a modification in wavelength in which a source signal has a single wavelength $\lambda_1$. After the source signal interacts with an object, the object returns a modified signal with a wavelength $\lambda_2$. In one arrangement, $\lambda_1$ is smaller than $\lambda_2$. In another arrangement, $\lambda_1$ is larger than $\lambda_2$. In some arrangements, the source signal has multiple wavelengths that may be modified by an object to produce a return signal with multiple wavelengths.

The signal modifications shown in the examples of FIGS. 8A, 8B, 8C can be used in combination with one another. For example, an object may include multiple ancillary components. In one example, an object includes wavelength and/or polarization specific filter(s). When a source electromagnetic radiation signal that includes three wavelengths reaches the object, one ancillary component may reflect the first wavelength in IR, another ancillary component may delay the second and third wavelengths in the signal, another ancillary component may reflect the second (now delayed) wavelength, and another ancillary component may delay the second wavelength a second time before the entire returned signal is sent out from the object. Thus, the three different wavelengths in the source signal each become a returned signal that is modified in a different way.

Several methods may be used to encode information into the returned signal including phase shift, polarization shift, wavelength or frequency shift, wavelength filtering, intensity shift, and/or stimulated emission (fluorescence). Each of these methods of information encoding can be accomplished through use of material compositions and structures specific to such encoding. These may include but are not limited to particles, platelets, cubes, or retroreflectors. These structures may include coatings and bulk materials that change the source signal to the returned signal in one of the methods described herein. The returned signal is thus encoded with specific useful information pertinent to the object that created it. A detection module may be configured to interpret the encoded return signal and thus rapidly identify and classify the object from which the returned signal came. Examples of objects with encoded materials include paint or laminated reflectors on vehicles, paint or laminated reflectors on roadway markers, signs, clothing, painted parking lot demarcations or signs.

Detector Module

Figure 9:
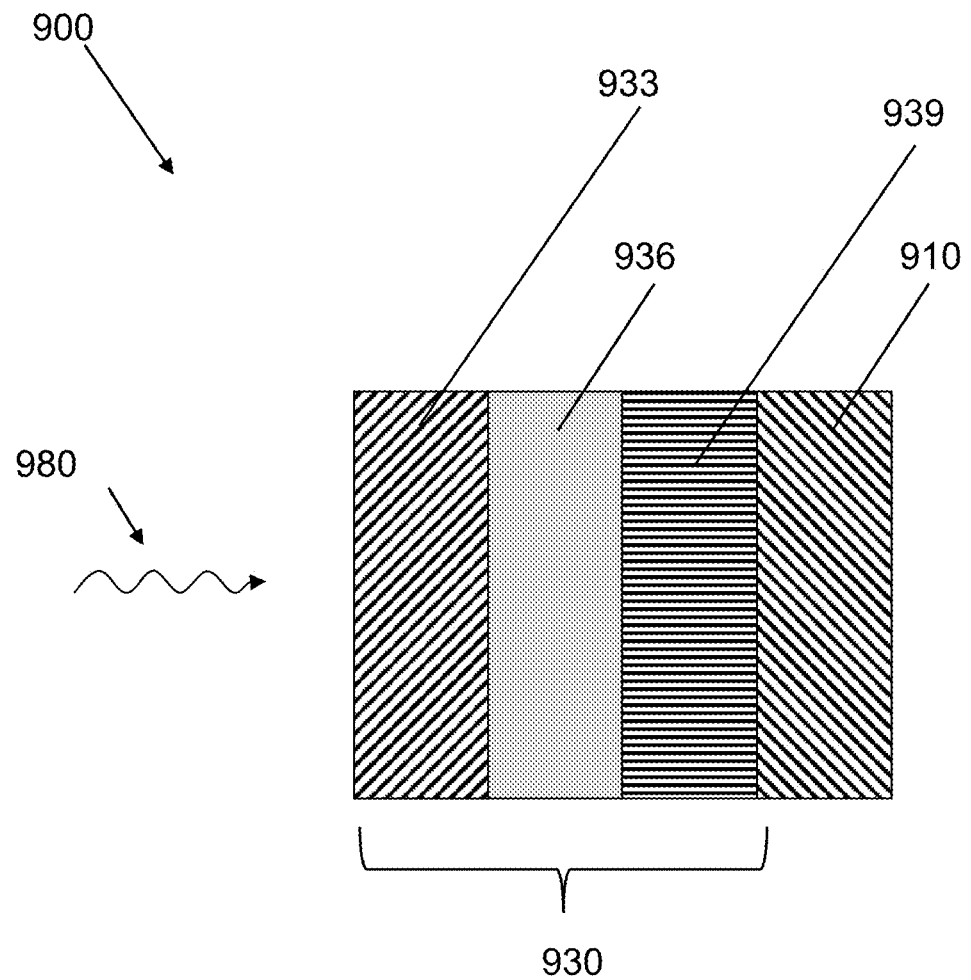
FIG. 9 is a schematic illustration of a single detector module, according to an embodiment of the invention.

FIG. 9 is a schematic illustration of a single detector module 900, according to an embodiment of the invention. The detector module 900 includes an electromagnetic radiation detector 110, and ancillary components 930 which may include an optical unit 933, a filter unit 936, and a wave guide unit 939. In some embodiments, the detector module 900 contains only the electromagnetic radiation detector 910. In some embodiments, the detector module 900 contains the electromagnetic radiation detector 110 and only one or two of the ancillary components 930, such as the optical unit 933, the filter unit 936, and the wave guide unit 939. In some embodiments, the detector module 900 contains the electromagnetic radiation detector 110 and any number of ancillary components 930, including one or more optical units 933, one or more filter units 936, and/or one or more wave guide units 939. In embodiments with multiples of the same kind of unit, each optical unit 933, filter unit 936, wave guide unit 939 may be configured to act differently upon the returned electromagnetic radiation signal 980. The detector module 900 is arranged so that returned electromagnetic radiation 980 travels through the ancillary components 930 before it reaches the detector 110. The ancillary components 930 may be arranged in any order, as would be understood by a person with ordinary skill in the art. In some arrangements, some or all of the ancillary components 930 are fixed in relation to one another and to the electromagnetic radiation detector 110. In some arrangements, some or all of the ancillary components 930 (including multiple ancillary components of the same kind) are configured to be moved linearly or rotationally relative to one another and/or relative to the electromagnetic radiation detector 910. In some arrangements, the detector module 900 contains an array of meta-pixels, each of which contains several individual detector pixels, as is discussed in more detail below.

In various embodiments of the invention, the electromagnetic radiation detector 910 includes one or more of a charge-coupled device (CCD), a CMOS (complementary metal oxide semiconductor) sensor, calorimetric detector, a quantum well detector, or a quantum dot detector. As would be understood by a person with ordinary skill in the art, any electromagnetic radiation detector designed to sense the returned electromagnetic radiation signals described herein could also be used in the embodiments of the invention. In some arrangements, the electromagnetic radiation detector 910 contains a single detector element. In some arrangements, the electromagnetic radiation detector 910 contains a multi-pixel detection matrix.

In some arrangements, ancillary components, as described above for use in the detector module, can be used similarly in the source module to control the characteristics of the source signal, such as its wavelength, frequency polarization, phase, and/or intensity. As described above, the source module (and ancillary components) may be co-located with the object of interest. In some arrangements, such ancillary components, are dynamically adjustable, such as in response to an applied field as described in more detail below.

Optical Unit

The optical unit 933 is configured to make changes in the intensity or the direction of the returned electromagnetic radiation signal. In various arrangements, the optical unit is an optical switch, an optical signal amplifier, or an optical signal attenuator.

In some arrangements, the optical unit is an optical switch. The optical switch may be based on MEMS technology which uses arrays of micro mirrors to deflect an electromagnetic radiation signal is a desired direction. The optical switch may be piezoelectric and may deflect an electromagnetic radiation signal using piezoelectric ceramics. The optical switch may be based on inkjet technology, in which a bubble is formed and the bubble blocks the path of the electromagnetic radiation signal. The optical switch may use liquid crystals to polarize light or to modify the polarization of light that is already polarized in response to an applied electric field. The optical switch may be thermal and may modify the refraction index of an interferometer by heating. The optical switch may be based on nonlinear methods which vary the diffraction pattern in a nonlinear optical material to deflect an electromagnetic radiation signal. The optical switch may use acousto-optic methods that change the refraction index of material in the optical unit as a result of strain induced by an acoustic field.

In some arrangements, the optical unit is an amplifier, and it increases the intensity of the returned electromagnetic radiation signal. Examples of electromagnetic radiation amplifiers include, but are not limited to, semiconductor optical amplifiers and Raman optical amplifiers. Semiconductor optical amplifiers are typically made from group III-V compound semiconductors such as GaAs/AlGaAs, InP/InGaAs, InP/InGaAsP and InP/InAlGaAs, although any direct band gap semiconductors may be used in such devices. In some arrangements, a semiconductor optical amplifier is pumped electrically or through use of a low power laser.

A Raman optical amplifier is an optical amplifier based on Raman gain, which results from the effect of stimulated Raman scattering. Typically, Raman amplifiers use optical fibers, bulk crystals, or waveguides in photonic integrated circuits as their active medium.

In some arrangements, the optical unit is an electromagnetic radiation attenuator, and it attenuates the intensity of the returned electromagnetic radiation signal. Examples of attenuation devices include but are not limited to, liquid crystal variable attenuators (LCVA) and lithium niobate devices. In some arrangements, the optical unit is configured to apply a fixed change of the intensity to the returned electromagnetic radiation signal.

In some arrangements, the optical unit is configured to be adjustable in how it can change the intensity of the returned electromagnetic radiation signal. Such adjustments may be controlled by wired or wireless signals as desired.

In some arrangements, the optical unit acts as a lens and is designed with fixed properties, such as electromagnetic radiation signal attenuation and focus length. In some arrangements, the optical unit acts as a tunable lens whose properties are adjustable, e.g., the properties can be changed by application of an electric field.

Filter Unit

The filter unit 936 is configured to transmit only returned electromagnetic radiation with particular characteristics, such as polarization states, phase shifts, and/or wavelengths.

Such a filter unit may contain any number of subunits, each of which is configured to transmit electromagnetic radiation with a particular characteristic. In some arrangements, the filter unit is a fixed filter and is designed to transmit only a particular polarization, phase shift, and/or wavelength pattern. In some arrangements, the filter unit is an adjustable filter and its transmission properties can be adjusted by wired or wireless signals as desired. In various embodiments of the invention, the filter unit includes one or more of materials described above in the "Materials for Changing Polarization" section.

Figure 10:
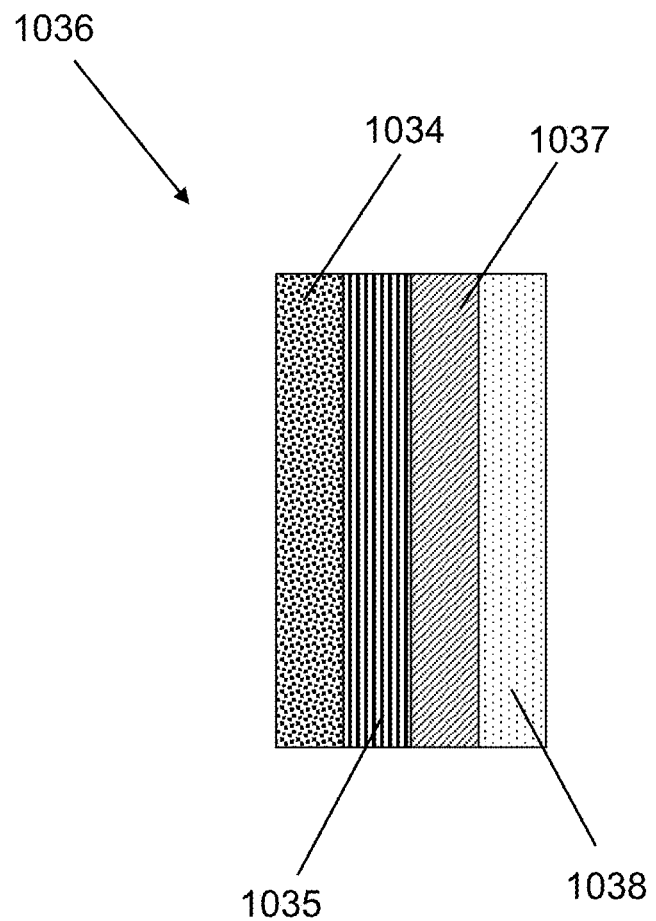
FIG. 10 is a schematic illustration of a filter unit that contains subunits, according to an embodiment of the invention.

FIG. 10 is a schematic illustration of a filter unit 1036 that contains subunits, according to an embodiment of the invention. The filter unit 1036 has three polarization filter subunits—a linear polarizer 1034, a retarding wave plate 1035, a polarization modifier 1037—and an optional wavelength filter 1038. In other embodiments, there may be more or fewer subunits.

In some arrangements, the linear polarizer layer 1034 is configured to allow passage of only a specific polarization at a specific location within the meta-pixel (i.e., at one or more pixels), and contains metal wires, metal nanoparticles, and/or liquid-crystal-based materials. In some arrangements, the metal wires, nanoparticles, and/or liquid crystals are embedded in or on a solid-state matrix with a fixed orientation. In some arrangements, the metal wires, nanoparticles, and/or liquid crystals are embedded in or on a soft matrix so that their positions may be changed in response to an applied electric field. In some arrangements, the linear polarizer layer 1034 may contain both regions of solid-state matrix and regions of soft matrix.

In some arrangements, the retarding wave plate 1035 is configured to change an electromagnetic radiation signal that has elliptical polarization to one that has linear polarization, (or vice versa) and may include birefringent materials such as described above. The birefringent material may be fixed in orientation or it may be designed to have an orientation that can be changed in response to an electric field.

In some arrangements, the polarizing modifier 1037 is configured to shift the polarization of a linearly-polarized returned electromagnetic radiation signal by rotation. In some arrangements, the polarizing modifier 1037 is configured to change the polarization of a circularly-polarized returned electromagnetic radiation signal from elliptical to linear polarization. In some arrangements, the polarizing modifier 1037 is configured to change the polarization of a circularly-polarized returned electromagnetic radiation signal from right circular polarization to left circular polarization. The amount and type of polarization modification may be fixed or may be adjustable in response of an applied external field.

In some arrangements, the polarizing modifier 1037 contains a birefringent material such as a birefringent oxide or polymer. In some arrangements, the polarizing modifier 1037 contains liquid crystals, oxide particles, or polymer particles. In some arrangements, the polarizing modifier 1037 contains chiral oxides, polymer microstructure, and/or plasmonic nanostructures.

Wave Guide Unit

The wave guide unit 939 is configured to guide the returned electromagnetic in a controlled way. In some arrangements, the wave guide unit is an optical interface for guiding returned electromagnetic radiation from one ancillary unit to another. or to the detector. In some arrangements, is an optical interface for guiding returned electromagnetic radiation to one or more detector units. In some arrangements, the properties of the wave guide unit are fixed. In some arrangements, the properties of the wave guide unit can be adjusted by application of an electric field that is controlled by either wired or wireless connection, as desired. In an exemplary embodiment, the wave guide unit can be controlled to direct the returned electromagnetic radiation to particular position(s) within the detector module 900 such as to an interface between the optical unit 933 and the filter unit 936 or to a desired portion of one or more detector units 110. Examples of wave guide materials include, but are not limited to, those based on liquid crystals technologies or MEMS micro mirror technologies. In some arrangements, planar wave guides include materials whose dielectric constants may be changed with application of an electric field using internal or external electrodes of the detector system.

Detector Arrays

A detector module may include an array of detectors, which can be used to create an encoded image of the object that has been detected. Each individual detector can contribute one pixel of information, and an array of pixels can be combined together electronically to the detector array. Each pixel may be coupled to one or more ancillary components such as optical units, filters, or wave guides so that each pixel is configured to detect a specific returned signal or a specific portion of a returned signal. Together, such pixels can provide detailed information about a returned signal. The more pixels, each one or several coupled to different ancillary components, the more detailed information can be received. For example, 18 pixels may receive information about the returned signal at 3 different wavelengths, and for each wavelength, at 6 different polarization angles. A meta-pixel can be thought of as equivalent to a normal camera pixel, and the meta-pixel defines the resolution of the detector.

Figure 11:
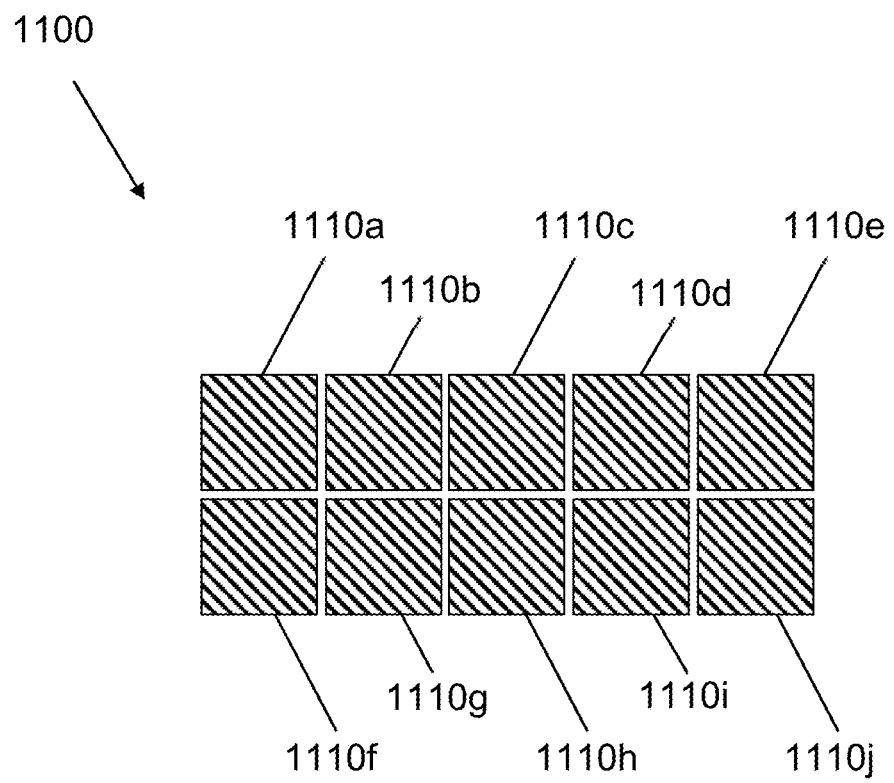
FIG. 11 is a plan-view schematic illustration of a meta-pixel that contains an array of electromagnetic radiation detectors, according to an embodiment of the invention.

FIG. 11 is a plan-view schematic illustration of a meta-pixel 1100 that contains a 10-pixel array of 10 electromagnetic radiation detectors 1110a-1110j, according to an embodiment of the invention. Although FIG. 11 is shown with 10 electromagnetic radiation detectors, it should be understood that any number of electromagnetic radiation detectors may be used to form a meta-pixel in the embodiments of the invention. Any number of such meta-pixels 1100 may be arranged together to form a detector module. The electromagnetic radiation detectors 1110a-1110j may be any of the devices described above. In some arrangements, the electromagnetic radiation detectors 1110a-1110j are all the same kind of device. In some arrangements, not all the electromagnetic radiation detectors 1110a-1110j are all the same kind of device. In some arrangements each electromagnetic radiation detector 1110a-1110j is associated with one or more ancillary components (not shown), as described above. Any one kind of ancillary component may be associated with just one, with several, or with all electromagnetic radiation detectors 1110x. Most of the electromagnetic radiation detectors 1110a-1110j are not associated with the same set of ancillary components so that they can detect different properties of the returned electromagnetic radiation signal. The number of individual electromagnetic radiation detectors 1110x in the meta-pixel determines the resolution of the returned signal characteristics, e.g., polarization, phase shift, and/or wave length. For an example, within a meta-pixel there may be different polarization filters on each pixel and one single wavelength filter that covers the full meta-pixel. Such an arrangement makes it possible to detect a polarization pattern on the pixel level and wavelength on the meta-pixel level. If two wave length ranges are considered, the imaging resolution of the detector is then determined with the number of meta-pixel pairs.

Figure 12:
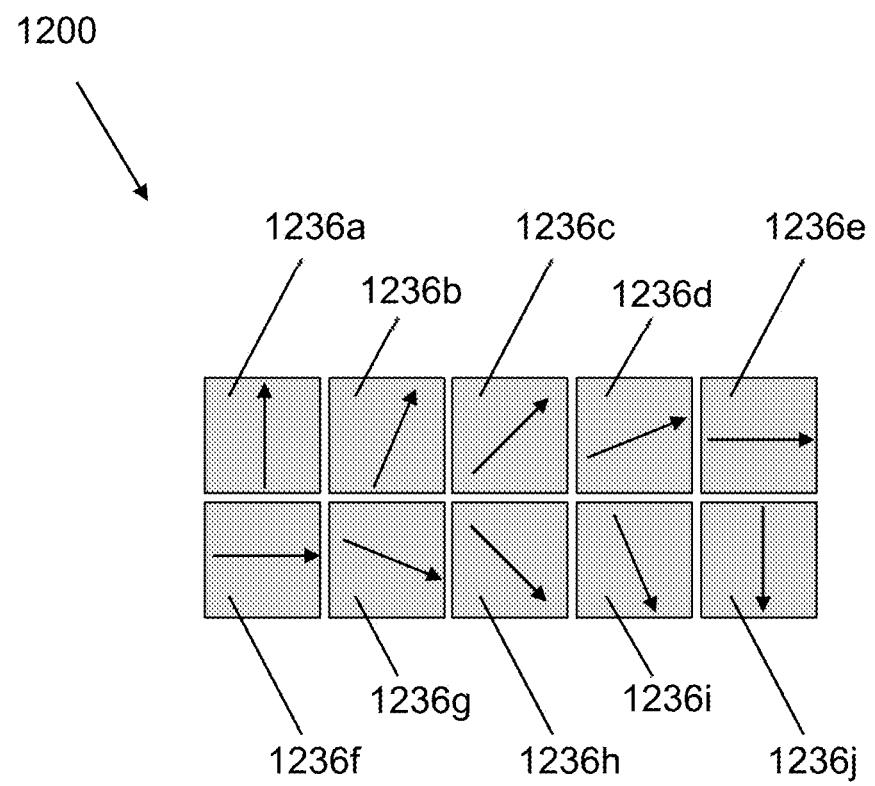
FIG. 12 is a plan-view schematic illustration of a meta-pixel that contains an array of electromagnetic radiation detectors that are coupled to linear polarization filters, according to an embodiment of the invention.

FIG. 12 is a plan-view schematic illustration of a meta-pixel 1200 that contains a 10-pixel array of 10 electromagnetic radiation detectors or pixels (such as the meta-pixel 1100 shown in FIG. 11), each of which is coupled to a different linear polarization filter unit 1236a-1236j, which together form a 10-pixel array, according to an embodiment of the invention. Although FIG. 12 is shown with 10 filter units, it should be understood that any number of filters may be used in association with a meta-pixel in the embodiments of the invention. FIG. 12 shows five pixel pairs of two pixels each in which the two pixels detect particular linear polarizations at 90° to one another: 1236a-1236f, 1236b-1236g, 1236c-1236h, 1236d-1236i, and 1236e-1236j. Together, the pixel pairs detect the intensities of the returned signal over the complete range of elliptical polarization. Such an arrangement carries redundant information in linear polarization and is therefore more failure-tolerant and less sensitive to noise and signal interferences. In another arrangement (not shown), instead of individual linear polarization filter units 1236a-1236j associated with each pixel, there is one dynamic polarization filter over some or all of the pixels. The dynamic filter contains a material that changes its polarization filtering properties in response to an electric field. The electric field is changed as the electric field intensity and the response of the pixel detectors are recorded together to provide a complete range of elliptical polarization and intensity information about the returned signal. Materials such as metal wires, metal particles, and liquid crystals can be used to make such a dynamic filter.

It is useful if the electrodes associated with the dynamic filter, or with any ancillary component that is controlled with an electric field, are transparent to the wavelengths of interest. Typical materials for transparent electrodes include, but are not limited to, indium tin oxides, zin oxides, and tin oxides.

As discussed above, any radiation detector may be associated with any number of ancillary components. Such ancillary components may have fixed properties or they may have properties that change under the influence of an electric field. In a detector array, each pixel detector may be associated with any number of electromagnetic radiation detectors.

Figure 13:
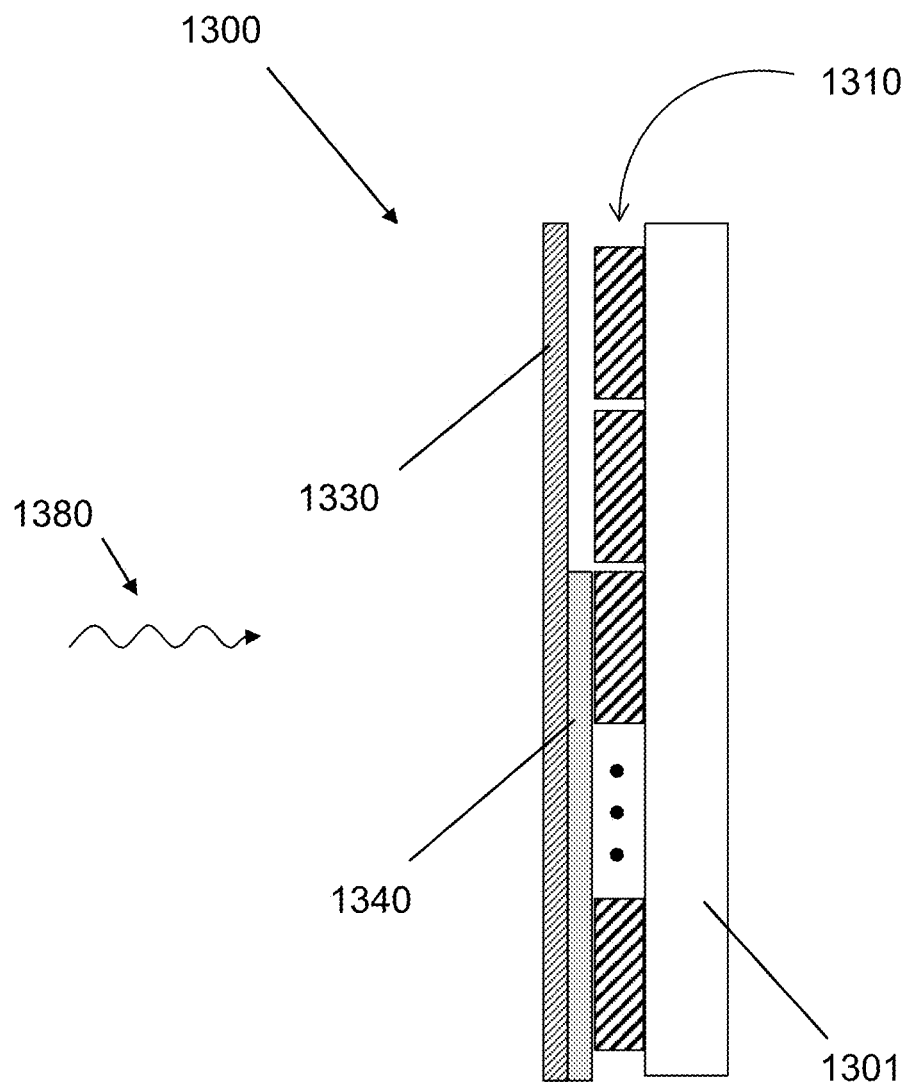
FIG. 13 is a schematic cross-section illustration of a portion of a meta-pixel that contains electromagnetic radiation detectors, according to an embodiment of the invention.

FIG. 13 is a schematic cross-section illustration of a portion 1300 of a meta-pixel that contains any number of electromagnetic radiation detectors 1310 on a substrate 1301, according to an embodiment of the invention. A returned electromagnetic radiation signal 1380 travels through two ancillary components 1330, 1340 before it reaches some of the electromagnetic radiation detectors 1310 and through only one ancillary component 1330 before it reaches some other radiation detectors 1310. In various arrangements, the ancillary components 1330 and 1340 are different and each configured to function as any of the ancillary components described above. In an exemplary embodiment, ancillary component 1330 is a wavelength filter, and ancillary component 1340 is a polarization filter. In some arrangements, the properties of one or both of the ancillary component 1330 and the ancillary component 1340 are fixed. In some arrangements, the properties of one or both of the ancillary component 1330 and the ancillary component 1340 can be adjusted through application of an electric field. In some arrangements (not shown), both the ancillary component 1330 and the ancillary component 1340 cover all of the electromagnetic radiation detectors 1310. In some arrangements, the returned electromagnetic radiation signal 1380 passes through additional ancillary components (not shown) before reaching at least some of the electromagnetic radiation detectors 1310.

Figure 14:
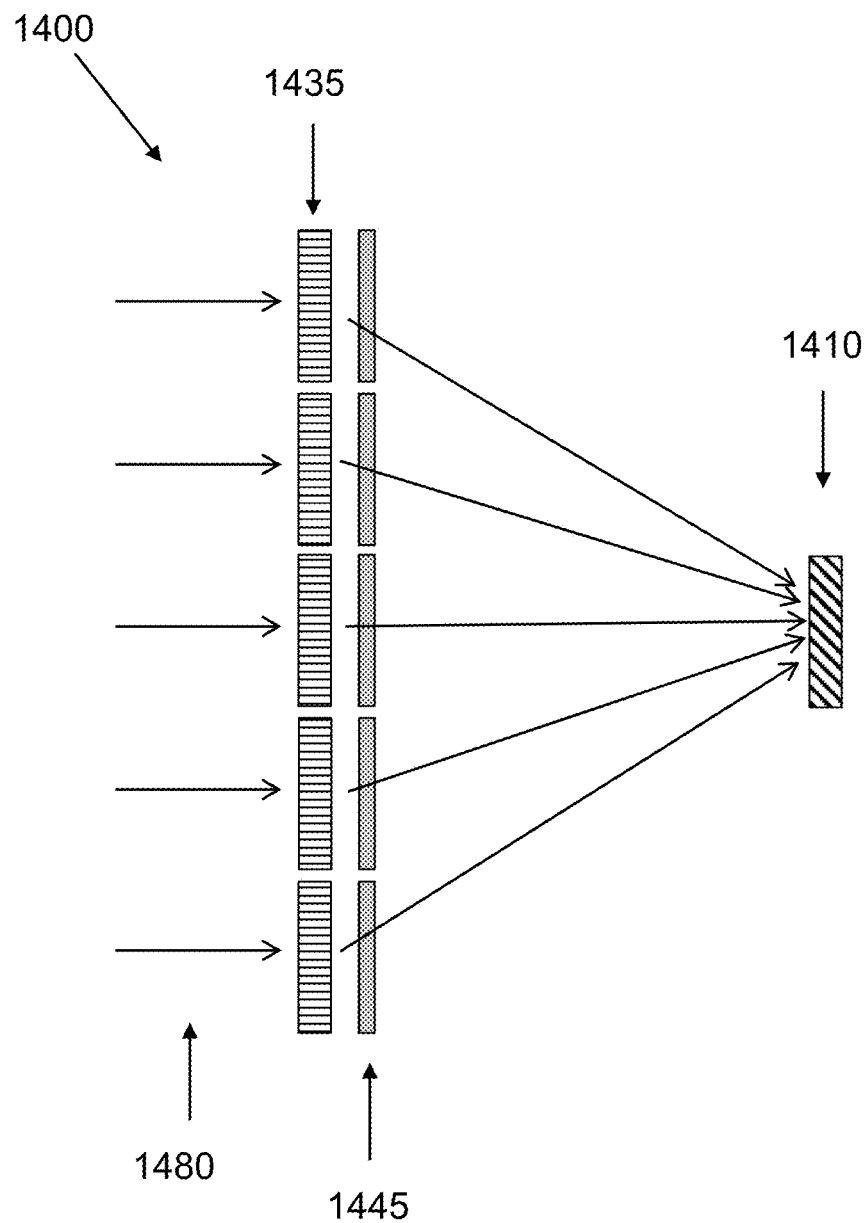
FIG. 14 is a schematic cross-section illustration of a detector module, according to an embodiment of the invention.

FIG. 14 is a schematic cross-section illustration of a detector module 1400, in an exemplary embodiment of the invention. The module 1400 contains an electromagnetic radiation detector 1410, five waveguides 1435, and five optical switches 1445. The waveguides bend the returned electromagnetic radiation signal D80 so that the entire signal can reach the electromagnetic radiation detector 1410. The optical switches 1445 can each be controlled separately to either block (off) the returned signal D80 or transmit (on) the returned signal D80 using an electromagnetic field. In one arrangement, the optical switches 1445 are all on. In one arrangement, the optical switches 1445 are switched on and off sequentially. In another arrangement, there are additional ancillary components associated with some or all of the waveguides 1445. A person of ordinary skill in the art would understand that In one arrangement, materials for use as waveguides are transparent in the wavelength of the returned electromagnetic radiation signal. In some arrangements, such materials have refraction indexes for light guidance in a range from 1 to 40, or from 1.2 to 3.

Examples of materials suitable for use as waveguides include, but are not limited to, tourmaline, calcite, quartz, sodium nitrate, rutile titanium oxides, nano lead sulfides, lead telluride, silicon, beryl, calomel, ice, lithium niobate, silicon oxides, aluminum oxide, iron oxides, peridot, sapphire, sodium nitrate, tourmaline, and zircon. Other materials useful for waveguides include those listed above in the "Materials for Wavelength Filtering" section.

Computer

The systems described herein include a computer system, according to some embodiments of the invention. In some arrangements, the computer system includes a computer processor comprising non-transitory computer readable media. In some arrangements, the computer processor is configured to compare a source electromagnetic radiation signal to a returned electromagnetic radiation signal in order to determine the modification that has been made by an object that has sent out the returned signal. The computer processor may be further configured to identity the object by correlating the modification in the signal with a list of known modulators and their signal modification properties.

For a detector module that contains an array of detectors (individual pixels), each pixel receives some portion of the returned signal, i.e., some information about the returned signal. The portions of the signal detected by each pixel may be different because of the particular ancillary components that may be coupled to each pixel as discussed above. The information from each pixel (and information about its ancillary component(s)) is compared to the known source signal and analyzed to determine any differences between the source signal and the returned signal, i.e., the kind of modulation that the source signal underwent to be changed into the returned signal. Such comparisons, as aggregated among all the pixels in the detector module, can be analyzed by the computer processor to determine the encoded signal associated with the object.

The computer may also determine other information about the object in addition to the nature of the modulation, such as distance, velocity, and location relative to other objects and the light source, modulators, and detector. The computer then uses the encoded information to compare against a database or lookup table in which the encoding in the returned signal can be matched with an object type or classification specific to that encoding. For example, a specific encoded signal may be analyzed and matched with an entry in the database for a specific object type such as a car, a pedestrian, a specific type of ice, a specific type or meaning of roadway paint marking, a traffic sign with specific meaning, a ticket code, a SKU code, or other such object. The information about such objects can then be made available to a system user in the form of a display or it can be sent to another system to be used to enhance navigation or for alerting a user to the proximity of the objects.

In some embodiments, the plurality of signals from the pixels in the detector are then composited to form an image which may be sent to a display for visualizing the field of view of the detector and highlighting regions by object type, including coloration for category or hazard level. For example, regions of ice on the roadway may be colored or highlighted, or objects of only a preselected type may be highlighted or displayed.

In some embodiments, the output of the computer is not used with a visual display but instead for control and guidance systems on a vehicle. In one arrangement, the output of the computer is sent to a transmitter to relay the information to another location. In one arrangement, the output of the computer used in an authentication or transaction system.

The system and methods of the embodiment described herein may implemented at least in part as a machine configured to receive a computer-readable medium storing computer-readable instructions. The instructions are preferably executed by computer-executable components preferably integrated with the telematic device application and the remote telematic platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

EXAMPLES

The following examples provide details relating to performance characteristics systems in accordance with the present invention. It should be understood the following is representative only, and that the invention is not limited by the detail set forth in these examples.

Figure 15:
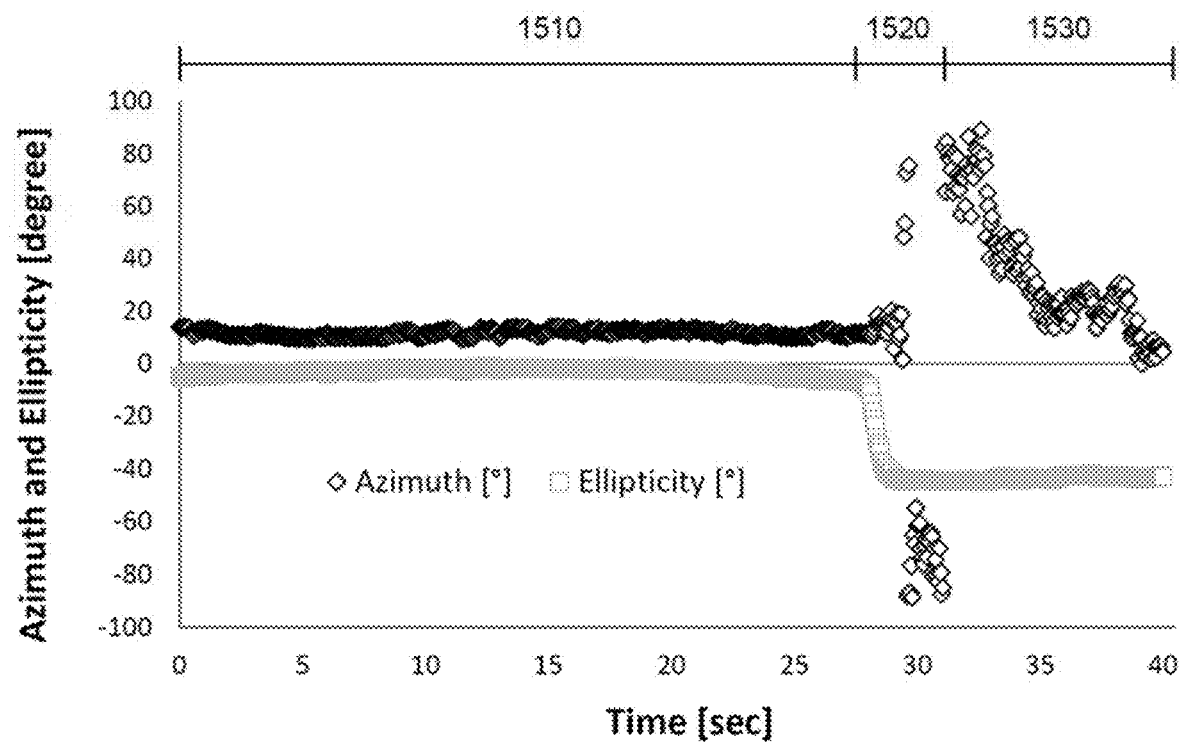
FIG. 15 is a graph that shows data that distinguishes between ice and water, in an exemplary embodiment.

In an exemplary embodiment, an enhanced object detection system described herein was used to distinguish ice from water. A temperature-controlled substrate was coated with water, and the water was frozen into a layer of ice. An electromagnetic radiation source sent a source signal in the direction of the layer of ice. The source signal had a known elliptical and linear polarization composition. A detector module configured to select for a range of circular polarization states was positioned to receive a returned signal from the ice. Data from the detector module was recorded over a time period in which the temperature of the temperature-controlled substrate began at freezing and was increased to effect melting of the layer of ice. FIG. 15 is a graph that shows two curves: azimuth as a function of time and ellipticity as a function of time. FIG. 15 shows that returned signals from ice 1510, from a mixture of ice and water 1520, and from water alone 1530 are very different. These states of water can be clearly identified from the polarization of the returned signal.

Figure 16A:
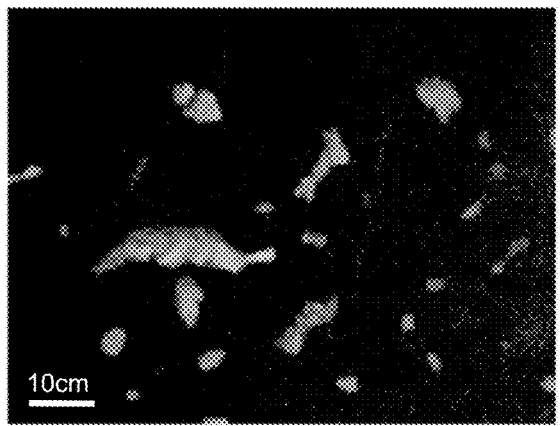
FIG. 16A is an image made using the system disclosed herein, in which ice islands appear as bright regions, in an exemplary embodiment.
Figure 16B:
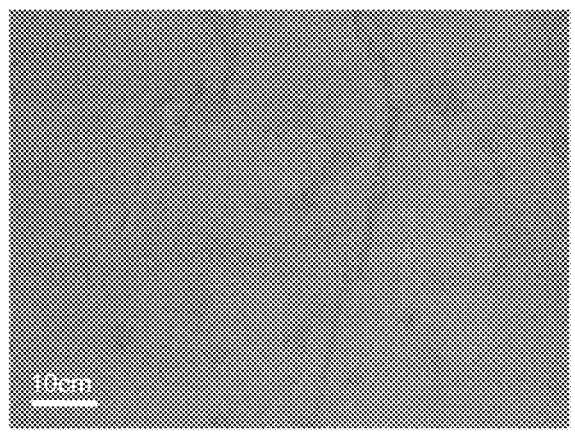
FIG. 16B is an optical image of the region shown in FIG. 16A.
Figure 17A:
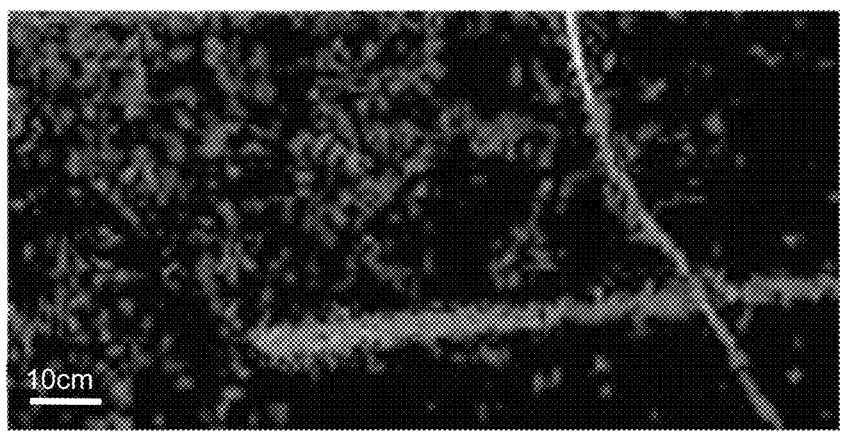
FIG. 17A is an image of asphalt made using the system disclosed herein, on one configuration, in an exemplary embodiment.
Figure 17B:
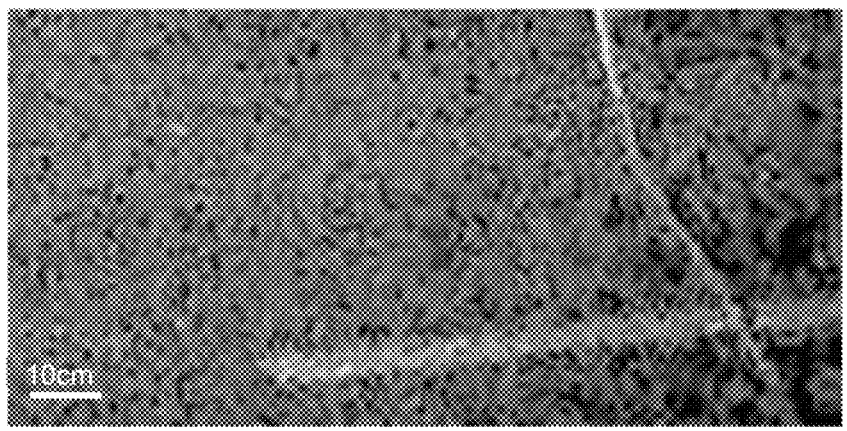
FIG. 17B is an image of the same asphalt in the same as shown in FIG. 17A made using the system disclosed herein, in another configuration, in an exemplary embodiment.
Figure 18A:
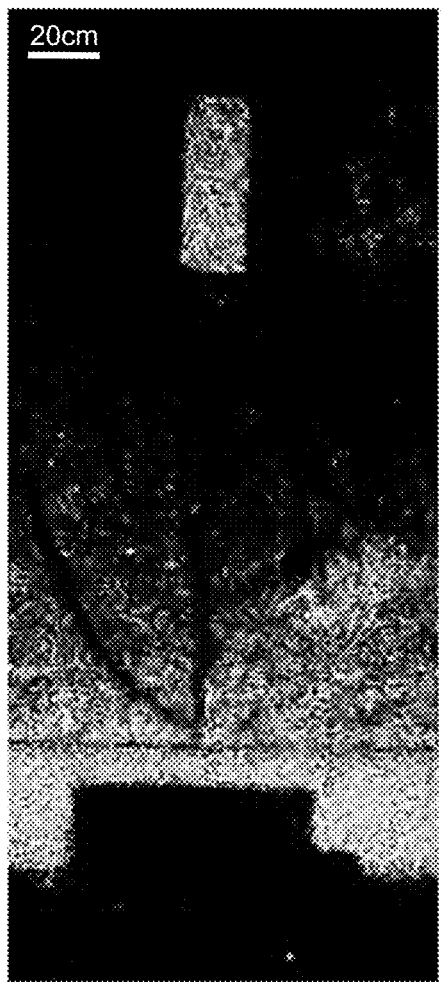
FIG. 18A is an image of a road sign near concrete made using the system disclosed herein, in one configuration, in an exemplary embodiment.
Figure 18B:
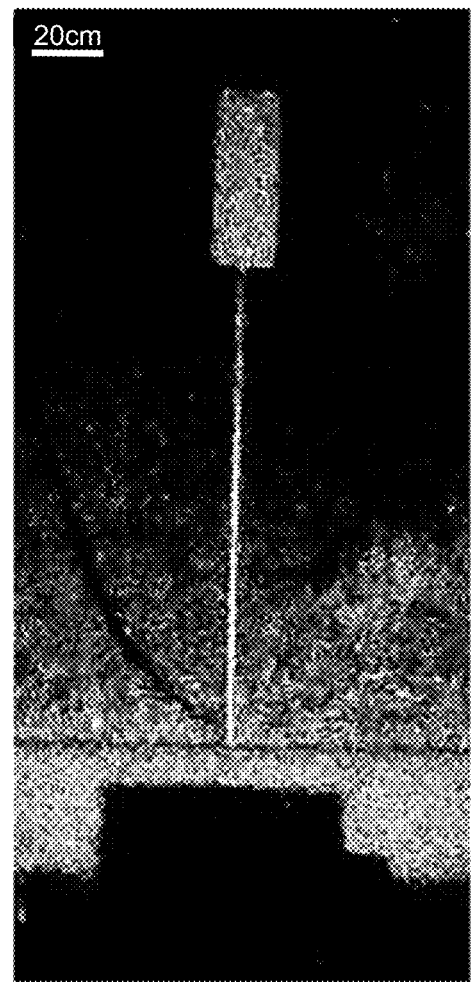
FIG. 18B is an image of the same road sign near concrete as shown in FIG. 18A made using the system disclosed herein, in another configuration, in an exemplary embodiment.

In an exemplary embodiment, an enhanced object detection system described herein was used to detect islands of ice in a water/ice layer. A temperature-controlled substrate was coated with water, and the water was partially frozen to form a layer of water that contained islands of ice. An electromagnetic radiation source sent a source signal in the direction of the water/ice layer. The source signal had a known elliptical and linear polarization composition. A detector module that contained an array of individual detectors, each configured to select for a particular elliptical polarization state was positioned to receive a returned signal from the ice. Data from the detector module was used to form the image shown in FIG. 16A in which ice islands appear as bright regions. For comparison, an optical image of the same region of the water/ice layer is shown in FIG. 16B. It is difficult to determine from FIG. 16B whether there is ice, water, or something else altogether on the surface. The image in FIG. 16A clearly identifies discrete regions of ice and, thus, could provide specific and detailed information that would be of use, for example, for drivers concerned about road conditions or for pilots concerned about ice In an exemplary embodiment, an enhanced object detection system described herein was used to detect asphalt. An electromagnetic radiation source sent a source signal in the direction of the asphalt. The source signal had a known elliptical and linear polarization composition. A detector module that contained an array of individual detectors, each configured to select for a particular circular polarization state was positioned to receive a returned signal from the asphalt. Data from the detector module was used to form the image shown in FIG. 17A in which the asphalt appears as dark regions and returns no unique signal. In a different detector mode, the detector module was used to form an image of the same region of the asphalt as shown in FIG. 17B, where the asphalt returns a strong signal with a unique polarization. By comparing the two imaging modes, the discrete areas of asphalt material can be identified, and this could provide specific and detailed information that would be of use, for example, for drivers and navigation systems concerned with identifying road lanes or navigable paths in unstructured spaces In an exemplary embodiment, an enhanced object detection system described herein was used to detect metal. An electromagnetic radiation source sent a source signal in the direction of the metal pole. The source signal had a known elliptical and linear polarization composition. A detector module that contained an array of individual detectors, each configured to select for a particular circular polarization state was positioned to receive a returned signal from the metal. Unmodified signs and areas of concrete adjacent to the asphalt served as reference intensity. Data from the detector module was used to form the image shown in FIG. 18A in which the metal appears dark and returns no unique signal. In a different detector mode, the detector module was used to form an image of the same region of the metal as shown in FIG. 18B, where now the metal returns a strong signal with unique polarization composition. By comparing the two imaging modes, the discrete areas of metal material can be identified, and this could provide specific and detailed information that would be of use, for example, for drivers and navigation systems concerned with identifying obstacles.

Figure 19:
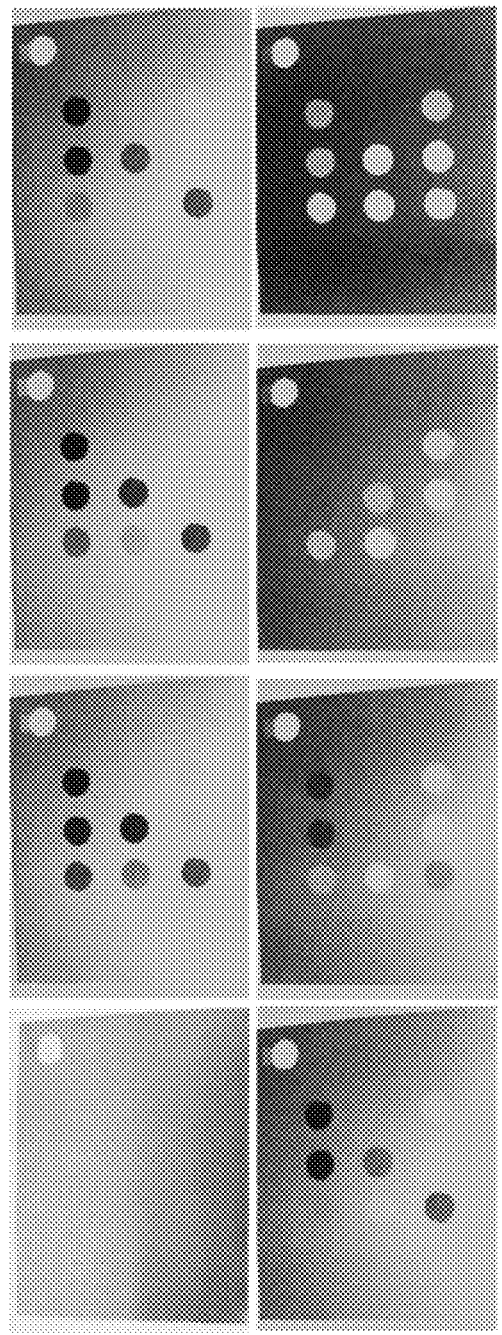
FIG. 19 shows a series of images of nine different polymer dots, in an exemplary embodiment.

In an exemplary embodiment, an enhanced object detection system described herein was used to detect nine polymer films in the shape of dots each encoded to create a different shift in polarization. The transparent polymer films were laminated on a metal reflective surface and covered with an inert protective coating. An electromagnetic radiation source sent a source signal in the direction of the object. The source signal had known elliptical and linear polarizations. A detector module that contained an array of individual detectors, each configured to select for a particular elliptical polarization state was positioned to receive a returned signal from the object. Data from the detector module was used to form the series of images shown in FIG. 19, each of which was produced from a detector tuned to a particular elliptical polarization. The nine dots appear with various intensities from dark to bright. The images in FIG. 19 clearly identify discrete states for each dot configured to return a unique polarization composition to a detector. The specific returned signal composition and the combination across the different shapes could encode specific and detailed information that would be of use, for example, for driving and navigation systems to classify and react to objects of specific types or scanning systems designed to authenticate objects or people in possession of the objects.

Figure 20:
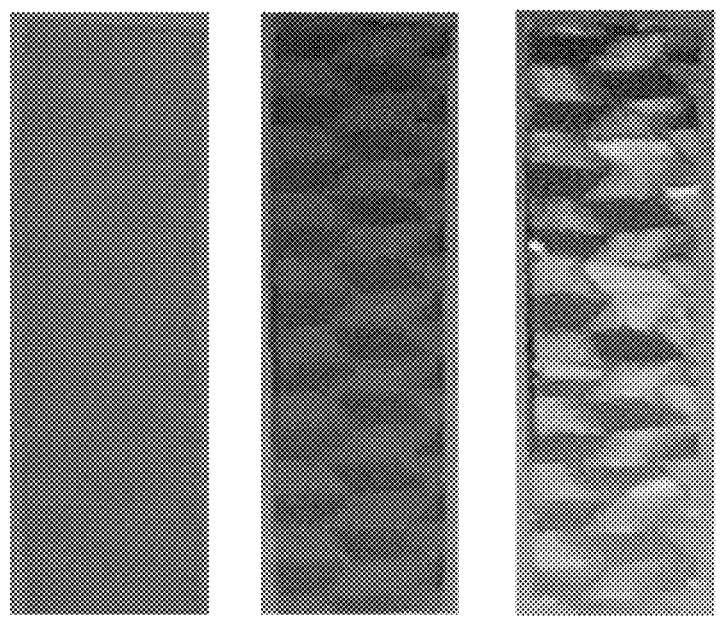
FIG. 20 shows a series of images made using the system disclosed herein in different configurations, in an exemplary embodiment.

In an exemplary embodiment, an enhanced object detection system described herein was used to detect fabric samples with discrete regions encoded to create a different shift in polarization. An electromagnetic radiation source sent a source signal in the direction of the fabric. The source signal had a known elliptical and linear polarization composition. A detector module that contained an array of individual detectors, each configured to select for a particular elliptical polarization state was positioned to receive a returned signal from the fabric. Data from the detector module was used to form the series of images shown in FIG. 20 in which the fabric reveals regions with discrete polarization compositions (middle and right samples) relative to the left sample where no discrete regions are visible when only illuminated in the visible spectrum. The images in FIG. 20 clearly identifies discrete states for each region of fabric configured to return a unique polarization composition to the detector. The specific returned signal composition and the combination across the different regions could encode specific and detailed information that would be of use, for example, for driving and navigation systems to classify and react to objects such as clothing or other materials worn by people or animals.

Figure 21:
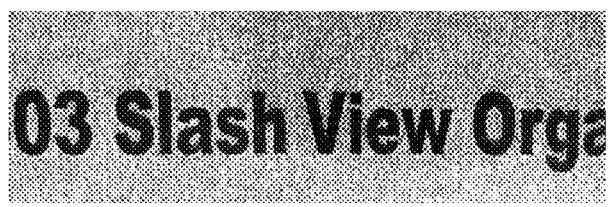
FIG. 21 shows two different images of the same object made using the system disclosed herein in different configurations, in an exemplary embodiment.
Figure 21:

In an exemplary embodiment, an enhanced object detection system described herein was used to detect a polymer coating on top of written text on a paper substrate. An electromagnetic radiation source sent a source signal in the direction of the sample. The source signal had a known polarization and wavelength composition. A detector module that contained an array of individual detectors, each configured to select for a particular wavelength state was positioned to receive a returned signal from the object. The coated region was configured to create a different shift in wavelength from the rest of the sample. Data from the detector module was used to form the series of images shown in FIG. 21 in which the text appears highlighted in the coated region as well as discrete dots appear above the text. The images in FIG. 21 clearly identifies discrete states for the coated region that was configured to return a unique wavelength composition to the detector. The specific returned signal composition and the combination across the sample could encode specific and detailed information that would be of use, for example, for driving and navigation systems to classify and react to objects of specific types or scanning systems designed to authenticate objects or people in possession of the objects.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A platform for an enhanced object detection system, comprising:
   a source of electromagnetic radiation;
   a first modulator in communication with the source of electromagnetic radiation;
   a detector module communicatively coupled to the enhanced object detection system, the detector module comprising:
   a first filer in communication with a first electromagnetic radiation detector; and
   a second filter in communication with a second electromagnetic radiation detector; and
   a computing system comprising non-transitory computer readable media and communicatively coupled to the source of electromagnetic radiation and to the detector module;
   the platform operable in a detection mode wherein:
   the source of electromagnetic radiation emits a source signal toward the first modulator;
   the first modulator transforms the source signal into a returned signal, wherein the returned signal includes a modification of at least one characteristic of the source signal, the characteristic selected from the group consisting of polarization state, wavelength, phase, intensity, and direction;
   the first modulator emits the returned signal;
   the first filter transmits a first portion of the returned signal to the first electromagnetic radiation detector, the first portion comprising a first characteristic selected from the group consisting of wavelength, polarization, phase, and intensity;
   the second filter transmits a second portion of the returned signal to the second electromagnetic radiation detector, the second portion comprising a second characteristic selected from the group consisting of wavelength, polarization, phase, and intensity; and
   the first characteristic and the second characteristic are different; and
   the computing system makes a first comparison between the source signal and the first portion of returned signal;
   makes a second comparison between the source signal and the second portion of the returned signal; and
   uses the first comparison, and the second comparison to generate a characterization of the modification and to provide an identification of the first modulator based on the characterization.

2. The platform of claim 1 wherein the source of electromagnetic radiation and the detector module are co-located.

3. The platform of claim 1 wherein the source of electromagnetic radiation and the first modulator are co-located.

4. The platform of claim 1 wherein the source signal comprises one or more wavelengths between 0.25 µm and 15 µm.

5. The platform of claim 1 wherein the source signal is polarized.

6. The platform of claim 1 wherein the source signal comprises a series of subsignals, and the subsignals are emitted sequentially.

7. The platform of claim 1 wherein the first modulator comprises a material selected from the group consisting of water, ice, snow, asphalt, and concrete.

8. The platform of claim 1 wherein the first modulator comprises a reflector.

9. The platform of claim 8 wherein the reflector comprises a coating, the coating is transparent to the source signal, and the coating comprises at least one material selected from the group consisting of chiral materials, birefringent materials, nonlinear optical materials, and fluorescent materials.

10. The platform of claim 1 wherein the detector module comprises at least one electromagnetic radiation detector selected from the group consisting of charge-coupled devices, CMOS sensors, quantum well detectors, and quantum dot detectors.

11. The platform of claim 10 wherein the first filter and the second filter each independently comprises a component selected from the group consisting of birefringent materials, chiral materials, plasmonic metals, nonlinear optical materials, fluorescent materials, and combinations thereof.

12. The platform of claim 11 wherein the first filter and the second filter each independently comprises a component selected from the group consisting of metal wires, metal nanoparticles, and liquid-crystal-based materials, the detector module comprises an electric field source, and, operable in a filter modulation mode, the electric field source applies an electric field to at least one of the first filter and the second filter and modulates a characteristic of at least one of the first filter and the second filter.

13. The platform of claim 1 wherein the detector module further comprises a third filter in communication with the first electromagnetic radiation detector, wherein, operable in a detection mode:
the third filter transmits a third portion of the returned signal, the third portion comprising a third characteristic selected from the group consisting of wavelength, polarization, phase, and intensity; and
the first characteristic and the third characteristic are different.

14. A platform for an enhanced object detection system, comprising:
a source of electromagnetic radiation;
a first modulator in communication with the source of electromagnetic radiation;
a detector module communicatively coupled to the enhanced object detection system, the detector module comprising:
a first filter in communication with a first electromagnetic radiation detector; and
a second filter in communication with a second electromagnetic radiation detector; and
a computing system comprising non-transitory computer readable media and communicatively coupled to the source of electromagnetic radiation and to the detector module;
the platform operable in a detection mode wherein,
the source of electromagnetic radiation emits a source signal toward the first modulator,
the first modulator transforms the source signal into a returned signal, wherein the returned signal includes a modification of at least one characteristic of the source signal, the characteristic selected from the group consisting of polarization state, wavelength, phase, intensity, and direction,
the first modulator emits the returned signal,
the first filter transmits a first portion of the returned signal to the first electromagnetic radiation detector, the first portion comprising a first characteristic selected from the group consisting of wavelength, polarization, phase, and intensity;
the second filter transmits a second portion of the returned signal to the second electromagnetic radiation detector, the second portion comprising a second characteristic selected from the group consisting of wavelength, polarization, phase, and intensity; and
the first characteristic and the second characteristic are different; and
the computing system:
makes a first comparison between the source signal and the first portion of returned signal;
makes a second comparison between the source signal and the second portion of the returned signal;
makes a third comparison between the first portion of the returned signal and the second portion of the returned signal; and
uses the first comparison, the second comparison, and the third comparison to generate a characterization of the modification and to provide an identification of the first modulator based on the characterization.

15. A platform for an enhanced object detection system, comprising:
a source of infrared radiation;
a first modulator in communication with the source of infrared radiation, the first modulator comprising a reflector;
a detector module communicatively coupled to the enhanced object detection system, the detector module comprising a first filter in communication with a first electromagnetic radiation detector; and
a second filter in communication with a second electromagnetic radiation detector; and
a computing system communicatively coupled to the source of infrared and to the detector module;
the platform operable in a detection mode wherein:
the source of infrared radiation emits a source signal toward the first modulator;
the first modulator transforms the source signal into a returned signal, wherein the returned signal includes a modification of at least one characteristic of the source signal, the characteristic selected from the group consisting of polarization state, wavelength, and intensity;
the first modulator emits the returned signal;
the first filter transmits a first portion of the returned signal to the first electromagnetic radiation detector, the first portion comprising a first characteristic selected from the group consisting of wavelength, polarization, phase, and intensity;
the second filter transmits a second portion of the returned signal to the second electromagnetic radiation detector, the second portion comprising a second characteristic selected from the group consisting of wavelength, polarization, phase, and intensity; and
the first characteristic and the second characteristic are different and
the computing system makes a first comparison between the source signal and the first portion of returned signal;
makes a second comparison between the source signal and the second portion of the returned signal; and
uses the first comparison, and the second comparison to generate a characterization of the modification and to provide an identification of the first modulator based on the characterization.

* * * * *